US012790564B2

(12) United States Patent
Comber et al.

(10) Patent No.: US 12,790,564 B2
(45) Date of Patent: Nov. 10, 2026

(54) NONIONIC FUNCTIONALIZED POLY ALKYL GLUCOSIDES AS ENHANCERS FOR FOOD SOIL REMOVAL

(71) Applicant: Colonial Chemical, Inc., South Pittsburg, TN (US)

(72) Inventors: Robert N. Comber, South Pittsburg, TN (US); John W. Baxter, South Pittsburg, TN (US); Robert J. Coots, South Pittsburg, TN (US); Xiangdong Sun, South Pittsburg, TN (US)

(73) Assignee: Colonial Chemical, Inc., South Pittsburg, TN (US)

( * ) Notice: Subject to any disclaimer, the term of this patent is extended or adjusted under 35 U.S.C. 154(b) by 675 days.

(21) Appl. No.: 17/624,537

(22) PCT Filed: Jul. 2, 2020

(86) PCT No.: PCT/US2020/040694

§ 371 (c)(1),
(2) Date: Jan. 3, 2022

(87) PCT Pub. No.: WO2021/003388

PCT Pub. Date: Jan. 7, 2021

(65) Prior Publication Data

US 2022/0259521 A1 Aug. 18, 2022

Related U.S. Application Data

(60) Provisional application No. 62/869,915, filed on Jul. 2, 2019.

(51) Int. Cl.

| | |
|---|---|
| ***A61K 8/00*** | (2006.01) |
| ***C11D 1/83*** | (2006.01) |
| ***C11D 3/06*** | (2006.01) |
| ***C11D 3/33*** | (2006.01) |
| *C11D 1/26* | (2006.01) |
| *C11D 1/34* | (2006.01) |
| *C11D 1/66* | (2006.01) |

(52) U.S. Cl.

CPC .................. *C11D 1/83* (2013.01); *C11D 3/06* (2013.01); *C11D 3/33* (2013.01); *C11D 1/26* (2013.01); *C11D 1/345* (2013.01); *C11D 1/662* (2013.01)

(58) Field of Classification Search

None

See application file for complete search history.

(56) References Cited

U.S. PATENT DOCUMENTS

| | | | | |
|---|---|---|---|---|
| 11,753,607 B2 * | 9/2023 | Naqvi | C11D 3/0026 134/6 |
| 2022/0047472 A1 * | 2/2022 | Speaker | C11D 3/373 |

FOREIGN PATENT DOCUMENTS

| | | | |
|---|---|---|---|
| KR | 20170135654 A * | 12/2017 | A61Q 19/00 |
| WO | WO2011/161604 A2 | 12/2011 | |

OTHER PUBLICATIONS

Colonial Chem: "Ultra Mild Color Protection Shampoo, Formulation No. 1021", Feb. 1, 2016 (Feb. 1, 2016), XP055731408, Retrieved from the Internet: U RL:https://www.colonialchem.com/fullpanel/uploads/files/1021-ultra-mild-colorprotection-shampoo--2c-lv--160nc-lmb--lipidc-psm-d9-.pdf.

* cited by examiner

*Primary Examiner* — Necholus Ogden, Jr.
(74) *Attorney, Agent, or Firm* — Stites & Harbison PLLC; Richard S. Myers, Jr.

(57) ABSTRACT

A cleaning composition that comprises a nonionic sorbitan alkyl polyglucoside crosspolymer, at least one functionalized alkyl polyglucoside, a water conditioning agent, water, and an acid source.

32 Claims, No Drawings

NONIONIC FUNCTIONALIZED POLY ALKYL GLUCOSIDES AS ENHANCERS FOR FOOD SOIL REMOVAL

PRIOR APPLICATIONS

This application claims priority from International Patent Application No. PCT/US2020/040694, filed Jul. 2, 2020, which claims benefit to U.S. Provisional Application No. 62/869,915 filed Jul. 2, 2019, the entire disclosures of which are incorporated herein by this reference.

FIELD OF THE INVENTION

The present invention relates to the field of cleaners, for example, hard surface cleaning compositions, and in particular the use of functionalized anionic or cationic alkyl polyglucosides surfactants in combination with nonionic-alkyl polyglucoside crosspolymer derivatives. Embodiments of the present invention are useful for superior and enhanced cleaning.

The present invention also relates to the field of industrial cleaners, specifically cleaning industrial hydrocarbon greases, and in particular the use of functionalized anionic or cationic alkyl polyglucosides surfactants in combination with nonionic-alkyl polyglucoside crosspolymer derivatives.

BACKGROUND OF THE INVENTION

Conventional detergents used in the ware washing and laundering industries, particularly those intended for institutional use, generally contain alkyl phenol ethoxylates (APEs). APEs are used in detergents as a cleanser and a degreaser for their effectiveness at removing soils containing grease from a variety of surfaces. Commonly used APEs include nonyl phenol ethoxylates (NPE) surfactants.

However, while effective, APEs are disfavored due to environmental concerns. For example, NPEs are formed through the combination of ethylene oxide with nonylphenol (NP). Both NP and NPEs exhibit estrogen-like properties and may contaminate water, vegetation and marine life. NPE is also not readily biodegradable and remains in the environment or food chain for indefinite time periods. Therefore, there was a need in the art for an environmentally friendly and biodegradable alternative that can replace APEs in hard surface cleaners.

This lead to the development of environmentally friendly functionalized alkyl polyglucosides surfactants derived from renewable bio-based resources were found to be effective in cleaning, including hard surface cleaning. Specifically, the classes of functionalized alkyl polyglucoside surfactants that were found to be effective for this purpose include: Quaternary functionalized alkyl polyglucosides (U.S. Pat. Nos. 8,557,760, 8,389,457, 8,877,703, and 10,035,975), Polyquaternary functionalized alkyl polyglucosides (U.S. Pat. No. 8,329,633), Polysulfonate functionalized alkyl polyglucosides (U.S. Pat. No. 8,262,805), Sulfonated alkyl polyglucosides (U.S. Pat. Nos. 8,071,520 and 8,216,988), Phosphate functionalized alkyl polyglucosides (U.S. Pat. Nos. 8,216,994 and 8,969,285), Poly phosphate functionalized alkyl polyglucosides (U.S. Pat. No. 8,287,659), Sulfosuccinate functionalized alkyl polyglucosides (U.S. Pat. No. 8,658,584), and Betaine functionalized alkyl polyglucosides (U.S. Pat. No. 8,299,009). The underlying functionalized alkyl polyglucosides of these formulations are patented, manufactured, or sold by Colonial Chemical, Inc., South Pittsburg, TN 37380 sold under the Poly Suga® and Suga® trade names.

These functionalized alkyl polyglucosides were found to be effective at cleaning food soil when formulated in combination with water, an acidulent (e.g., phosphoric acid), and a water-conditioning agent such as a chelant (e.g., EDTA). In another example, the cleaning composition comprises the same aforementioned ingredients combined with less than 0.5% by weight alkyl phenol ethoxylates. These cleaning solutions are capable of removing soils including up to 20% proteins. Most significantly, these formulations were effective at soil cleaning with little or no nonyl phenol ethoxylates present and were more effective than the latter in their cleaning potential.

In another example, the functionalized alkyl polyglucoside constitutes between about 40% and about 80% by weight of the cleaning composition, the water conditioning agent constitutes between about 4% and about 8% by weight of the cleaning composition, and the water constitutes between about 25% and about 65% by weight of the cleaning composition.

The present inventors have discovered that when functionalized alkyl polyglucosides are combined with a nonionic alkyl polyglucoside crosspolymer, superior and unexpected results are achieved Specifically, as described herein, the present inventors have discovered that the nonionic alkyl polyglucoside crosspolymers of the present invention are not acceptable cleaning agents when used alone. However, unexpectedly when combined with the functionalized alkyl polyglucosides of the present invention, superior cleaning qualities are achieved, and the formulator is required to use less of the functionalized alkyl polyglucosides described in the prior art. In some embodiments, 50% less is required.

Another aspect of the invention is a method of removing grease and grease stains from a surface. It is well known that removing hydrocarbon-containing solids from surfaces can be extremely difficult. These hydrocarbon-containing soils may include industrial types of greases such as motor oil and lithium grease, and food greases such as lard and vegetable oils, as well as a wide range of other oily, greasy materials. The goal of formulating a cleaning composition that will effectively remove greasy residues from a hard surface has led to a large array of cleaning compositions on the industrial market. In general, the user wishes to achieve fast cleaning using the least amount of cleaning composition possible to avoid leaving behind residual chemical on the surface being cleaned.

There have been attempts to make improved cleaning compositions. They have included compositions providing improved cleaning that were substantially non-streaking on hard surfaces and contain a surfactant of amine oxide and a quaternary amine salt and a slightly polar organic compound. These cleaning solutions are effective for food soils, grease and the like.

Another class of cleaning compositions are those capable of removing hydrophobic soils, such as food grease and the like are those containing a nonionic surfactant, and a very slightly water soluble organic solvent.

Although many commercially available cleaning compositions are quite effective at cleaning food grease, and others, particularly solvent-based cleaning compositions, are quite effective at removing industrial grease, the development of a cleaning composition that is effective in removing both food and industrial grease has been particularly challenging. Users are always desirous of improved grease removal properties in cleaning compositions, especially those that are capable of penetrating and emulsifying the soil quickly.

U.S. Pat. No. 6,849,589 reports a synergistic combination of nonionic surfactants, quaternary amine salts and slightly water-soluble polar organic compounds for the effective removal of both food soil and industrial grease.

U.S. Pat. No. 6,528,478 reports the use of a combination of a water-insoluble organic solvent, an amine and a nonionic amine oxide-based surfactant for removing oxidized grease stains form hard surfaces.

US Published Paten Application No. 2013/0184192 reports that concentrated acid solutions containing an acid, a buffering salt and a surfactant can be used to remove grease from kitchen floor surfaces.

The present invention is advantageous over the prior art because it provides an environmentally friendly, easy to use, effective soil/grease removal formulation.

SUMMARY OF THE INVENTION

One embodiment of the invention is a cleaning composition that comprises a nonionic sorbitan alkyl polyglucoside crosspolymer, at least one functionalized alkyl polyglucoside, a water conditioning agent, water, and an acid source.

In other embodiments, the nonionic sorbitan alkyl polyglucoside crosspolymer is present from about 0.77% to 80% by weight; the at least one functionalized alkyl polyglucoside is present from about 1.7% to 80% by weight; the water conditioning agent is present from about 0.38% to about 18% by weight; water is present q.s., as needed to make 100% by weight; and the acid source is present from about 0.028% to about 0.55% by weight.

In other embodiments, the active amounts are: about 0.5% to 52% actives of a nonionic sorbitan alkyl polyglucoside crosspolymer; and about 0.5% to 32% actives of at least one functionalized alkylpolyglucoside.

In other embodiments, the nonionic alkyl polyglucoside crosspolymer is a sorbitan alkyl polyglucoside crosspolymer. Also, the sorbitan alkyl polyglucoside crosspolymer may be a sorbitan oleate polyglucoside crosspolymer.

In other embodiments of the invention, the nonionic alkyl polyglucoside may be derived from a renewable carbon source. The carbon source may be chosen from a sulfonate, phosphate, quaternized, and/or sulfosuccinate functionalized alkyl polyglucoside.

Definitions

Unless otherwise indicated, all numbers expressing quantities of ingredients or reaction conditions used herein are to be understood as being modified in all instances by the term "about".

As used herein, weight percent (wt-%), percent by weight, % by weight, and the like are synonyms that refer to the concentration of a substance as the weight of that substance divided by the total weight of the composition and multiplied by 100.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities.

The term "alkyl" refers to a straight or branched chain monovalent hydrocarbon radical having a specified number of carbon atoms. Alkyl groups may be unsubstituted or substituted with substituents that do not interfere with the specified function of the composition and may be substituted once or twice with the same or different group. Substituents may include alkoxy, hydroxy, mercapto, amino, alkyl substituted amino, nitro, carboxy, carbanyl, carbanyloxy, cyano, methylsulfonylamino, or halogen, for example. Examples of "alkyl" include, but are not limited to, methyl, ethyl, n-propyl, isopropyl, n-butyl, s-butyl, t-butyl, n-pentyl, n-hexyl, 3-methylpentyl, and the like.

The term "surfactant" or "surface active agent" refers to an organic chemical that when added to a liquid changes the properties of that liquid at a surface.

"Cleaning" means to perform or aid in soil and or/grease removal, bleaching, microbial population reduction, rinsing, or combination thereof. The terms soil and grease are to be interpreted broadly.

As used herein, the term "substantially free" refers to compositions completely lacking the component or having such a small amount of the component that the component does not affect the effectiveness of the composition. The component may be present as an impurity or as a contaminant and shall be less than 0.5 wt. %. In another embodiment, the amount of the component is less than 0.1 wt. % and in yet another embodiment, the amount of component is less than 0.01 wt. %.

As used herein, the term "ware" includes items such as eating and cooking utensils. As used herein, the term "ware washing" refers to washing, cleaning, or rinsing ware.

As used herein, the term "hard surface" includes showers, sinks, toilets, bathtubs, countertops, windows, mirrors, transportation vehicles, floors, and the like. These surfaces can be those typified as "hard surfaces" (such as walls, floors, bed-pans).

As used herein, a solid cleaning composition refers to a cleaning composition in the form of a solid such as a powder, a particle, an agglomerate, a flake, a granule, a pellet, a tablet, a lozenge, a puck, a briquette, a brick, a solid block, a unit dose, or another solid form known to those of skill in the art. The term "solid" refers to the state of the detergent composition under the expected conditions of storage and use of the solid detergent composition. In general, it is expected that the detergent composition will remain in solid form when exposed to temperatures of up to about 100° F. and greater than about 120° F. A cast, pressed, or extruded "solid" may take any form including a block. When referring to a cast, pressed, or extruded solid it is meant that the hardened composition will not flow perceptibly and will substantially retain its shape under moderate stress or pressure or mere gravity, as for example, the shape of a mold when removed from the mold, the shape of an article as formed upon extrusion from an extruder, and the like. The degree of hardness of the solid cast composition can range from that of a fused solid block, which is relatively dense and hard, for example, like concrete, to a consistency characterized as being malleable and sponge-like, similar to caulking material.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the terms "alkyl phenol ethoxylate free" or "NPE-free" refers to a composition, mixture, or ingredients that do not contain alkyl phenol ethoxylates or phenol-containing compounds or to which the same has not been added. Should alkyl phenol ethoxylates or -alkyl phenol ethoxylate containing compound be present through contamination of a composition, mixture, or ingredients, the amount of the same shall be less than 0.5 wt. %. In another embodiment, the amount of is less than 0.1 wt. % and in yet another embodiment, the amount is less than 0.01 wt. %.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both, when using the substitute cleaning product or substitute cleaning system rather than a alkyl phenol ethoxylate-containing cleaning to address a typical soiling condition on a typical substrate. This degree of cleanliness may, depending on the particular cleaning product and particular substrate, correspond to a general absence of visible soils, or to some lesser degree of cleanliness, as explained in the prior paragraph.

DESCRIPTION OF EMBODIMENTS OF THE PRESENT INVENTION

As stated above, one embodiment of the invention is a cleaning composition that comprises a nonionic sorbitan alkyl polyglucoside crosspolymer, at least one functionalized alkyl polyglucoside, a water conditioning agent, water, and an acid source.

Embodiments of the present invention relate to hard surface cleaning compositions and methods of using the cleaning compositions for cleaning and removing organic soils from a surface. In particular, the cleaning composition is effective at removing soils including proteins, lard and oils from various surfaces. For example, the cleaning composition is effective at removing soils containing up to about 20% protein. Embodiments of the present invention also comprise bio-based surfactants, manufactured using renewable carbon and is thus an alternative to synthetic oil based surfactants. In one embodiment, the cleaning compositions are free or substantially free of alkyl phenol ethoxylates (APEs) such as nonyl phenol ethoxylates (NPEs). Thus, the cleaning compositions of the present invention provide a green, readily biodegradable replacement for conventional detergent surfactants. The cleaning compositions can be used in various industries, including, but not limited to: manual and automatic ware washing, food and beverage, vehicle care, quick service restaurants and textile care. In particular, the cleaning compositions can be used in hard-surface cleaning applications, including, for example: bathroom surfaces, dishwashing equipment, food and beverage equipment, vehicles and tabletops.

The present invention comprises hard surface cleaning compositions containing unique combinations of environmentally-friendly surfactants derived from renewable bio-based resources that clean more efficiently than compositions containing only the functionalized alkyl polyglucoside surfactants mentioned above. Specifically, it has been discovered that blends of any of the aforementioned functionalized alkyl polyglucosides in combination with a nonionic alkyl polyglucoside cross polymer clean at par or more effectively than these surfactants alone, and that in many cases in less time.

One example of a nonionic alkyl polyglucoside of the present invention is a sorbitan oleate decylglucoside crosspolymer (such as Poly Suga® Mulse D9 and Poly Suga® Mulse D6 sold by Colonial Chemical, Inc., South Pittsburg, TN 37380) What the inventors found to be unexpected is that a sorbitan oleate decylglucoside crosspolymer (Poly Suga® Mulse D9 or Poly Suga® Mulse D6) used alone in the same cleaning formulations takes more than twice the time to clean as any of the cationic or anionic functionalized alkyl polyglucosides mentioned in the prior art. The present inventors discovered that when a sorbitan oleate decylglucoside crosspolymer is combined with the functionalized alkyl glucosides in the cleaning formulations, the formulations unexpectedly clean more effectively and in most cases quicker than the formulations with the anionic or cationic surfactants at full strength. A sorbitan oleate decylglucoside crosspolymer of the present invention is free of 1,4-dioxane, ethylene oxide and nonylphenol ethoxylates, and are not derivatized with any poly-PEG side chains.

Thus, one embodiment of the present invention is a cleaning agent that comprises (1) a nonionic alkyl polyglucoside crosspolymer, such as a sorbitan oleate decylglucoside crosspolymer, and (2) a functionalized alkyl polyglucoside.

(1) Nonionic Alkyl Polyglucoside

An example of a nonionic alkyl polyglucoside cross polymer of the present invention is cross polymers of alkylpolyglucosides and sorbitan esters as sugar-based nonionic surfactants, represented as compounds of the following formulae, and positional isomers thereof, as a mixture:

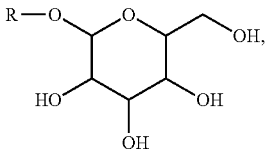

(a)

wherein;

R is alkyl having 8 to 22 carbon atoms; and

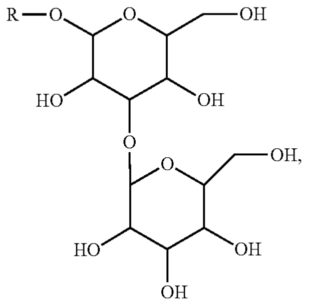

(b)

wherein:

R is alkyl having 8 to 22 carbon atoms; and (c) a sorbitan ester of the following structure:

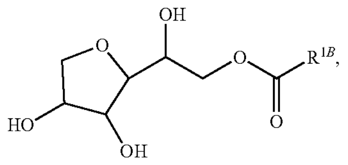

wherein:

$R^{1B}$ is alkyl having 7 to 21 carbons;

a crosslinking agent of the following structure:

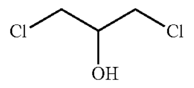

in water; and optionally a functionalizing agent selected from the group of:

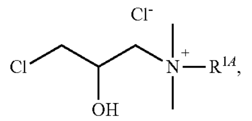

$Cl—CH_2—CH(OH)—SO_3M$, $Cl—CH_2—CH(OH)—SO_4M$, $Cl—CH_2—CH(OH)CH_2—OP(O)—(OM)_2$, and mixtures thereof;

wherein $R^{1A}$ is $CH_3—(CH_2)_n—$, n is an integer from 0 to 36;

M is a charge balancing group selected from H, Na, K, or $NH_4$; and positional isomers thereof.

The cross polymers of alkylpolyglucosides and sorbitan esters that are the sugar-based nonionic surfactants of the current invention are manufactured by Colonial Chemical, Inc., South Pittsburg, TN 37380, two examples of which are Poly Suga® Mulse D6 and Poly Suga® Mulse D9, both described as sorbitan oleate decylglucoside cross polymer.

These surfactants are synthesized by the methods outlined in U.S. Pat. No. 8,268,766.

(2) Functionalized Alkyl Polyglucoside

Examples of the functionalized alkyl polyglucoside of the present invention include, but are not limited to the following: Quaternary functionalized alkyl polyglucosides (U.S. Pat. Nos. 8,557,760, 8,389,457, 8,877,703, and 10,035,975), Polyquaternary functionalized alkyl polyglucosides (U.S. Pat. No. 8,329,633), Polysulfonate functionalized alkyl polyglucosides (U.S. Pat. No. 8,262,805), Sulfonated alkyl polyglucosides (U.S. Pat. Nos. 8,071,520 and 8,216,988), Phosphate functionalized alkyl polyglucosides (U.S. Pat. Nos. 8,216,994 and 8,969,285), Poly phosphate functionalized alkyl polyglucosides (U.S. Pat. No. 8,287,659), Sulfosuccinate functionalized alkyl polyglucosides (U.S. Pat. No. 8,658,584), and Betaine functionalized alkyl polyglucosides (U.S. Pat. No. 8,299,009), and derivatized alkyl polyglucosides manufactured, and sold by Colonial Chemical, Inc., South Pittsburg, TN 37380 sold under the Poly Suga® and Suga® trade names.

Other examples of the functionalized alkyl polyglucoside of the present invention include, but are not limited to at least one surfactant disclosed in U.S. Pat. No. 6,627,612, and/or surfactants sold by Colonial Chemical, Inc. under the brand names Suga® Nate and Suga® Fax.

Another example is those disclosed in U.S. Pat. No. 6,958,315, incorporated herein by reference; and/or surfactants sold by Colonial Chemical, Inc. under the brand name Suga® Glycinate.

Another embodiment of the present invention is a surfactant disclosed in U.S. Pat. No. 8,268,766, incorporated herein by reference; and/or surfactants sold by Colonial Chemical, Inc. under the brand name PolySuga® Mulse Another example is those disclosed in U.S. Pat. No. 7,507,399, and/or surfactants sold by Colonial Chemical, Inc. under the brand names PolySuga® Quats, PolySuga® Nates, and PolySuga® Phos.

Another example is those disclosed in U.S. Pat. No. 7,087,571, and/or surfactants sold by Colonial Chemical, Inc. under the brand name Suga® Mates.

Another embodiment of the present invention is a surfactant disclosed in U.S. Pat. No. 7,335,627, and/or surfactants sold by Colonial Chemical, Inc. under the brand name Poly Suga® Carb.

Other embodiments of the present invention include surfactants that are sugar-based sulfonate-, phosphate-, glycinate-, sulfosuccinate-, and carboxylate-containing surfactants derived from alkylpolyglucosides, including those disclosed in U.S. Pat. Nos. 6,627,612; 6,958,315; 7,087,571; and 7,335,627.

At least one functionalized alkyl polyglucoside may be used. Thus, in one embodiment, two, three, four, or more functional alkyl polyglucosides may be blended to comprise the functionalized alkyl polyglucoside component of the cleaning composition of the present invention.

These derivatized alkyl polyglucosides are naturally derived, do not possess polyoxyethylene groups (or contain residual ethylene oxide monomer or 1,4-dioxane), are biodegradable and in many cases have been found to have very low skin and eye irritation.

In one embodiment the derivatized alkyl polyglucoside is chosen from a carboxymethyl derivatized alkyl polyglucoside, a sulfonate derivatized alkyl polyglucoside, a phosphate derivatized alkyl polyglucoside, a sulfosuccinate derivatized alkyl polyglucoside, a glycinate derivatized alkyl polyglucoside, and a citrate derivatized alkyl polyglucoside.

In another embodiment of the present invention, the derivatized alkyl polyglucoside is chosen from a polysulfonate derivatized alkyl polyglucoside, polyphosphate derivatized alkyl polyglucoside, polyquaternary derivatized alkyl polyglucoside, polycarboxylated derivatized alkyl polyglucoside, and a polycitrate derivatized alkyl polyglucoside.

In one embodiment of the present invention, the derivatized polyglucoside surfactant of the present invention comprises a monosaccharide unit, a disaccharide unit, a linker, and a functionalizing agent.

In this regard, a derivatized alkyl polyglucoside composition of the present invention includes the following, as a mixture:

(a)

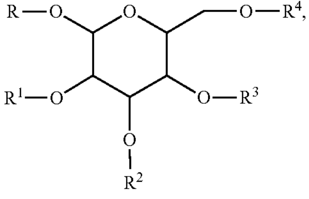

and (b)

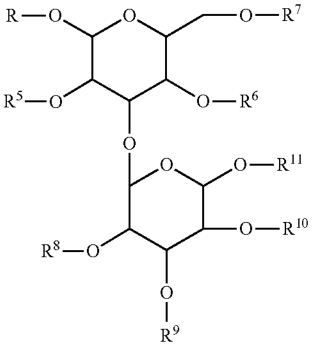

wherein:

R is an alkyl chain having 8 to 22 carbon atoms;

$R^1$, $R^2$, $R^3$, $R^4$ $R^5$, $R^6$, $R^7$, $R^8$, $R^9$, $R^{10}$, and $R^{11}$ are independently selected from the group consisting of: $—CH_2—C(O)—O^-M^+$, or $—C(O)CH_2—C(O)—O^-M^+$

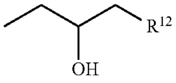

and H, with the proviso that $R^1$-$R^{11}$ are not all H;

$R^{12}$ is selected from the group consisting of:

$—OH$, $—SO_3^-M^+$, and $—SO_4^{-2}M^+$, $—O—P(O)—(OM)_2$, $—N(CH_3)_2—R^{1A}$, $—O—C(O)—CH_2—OH(SO_3^-M^+)—C(O)—O^-M^+$,

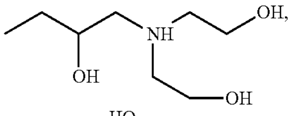

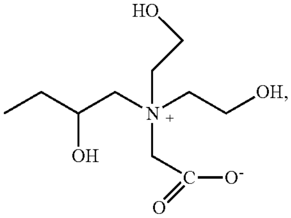

and

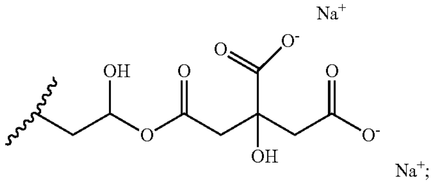

$R^{1A}$ is $CH_3—(CH_2)_n—$;

M is a charge balancing group selected from H, Na, K, or $NH_4^+$; and n is an integer from 0-36;

and positional isomers thereof.

In one embodiment of the present invention, the derivatized polyglucoside surfactant of the present invention comprises a monosaccharide unit, a disaccharide unit, a crosslinking agent, and a functionalizing agent.

In this regard, a derivatized alkyl polyglucoside composition of the present invention includes the following, as a mixture:

(a)

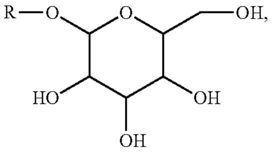

and (b)

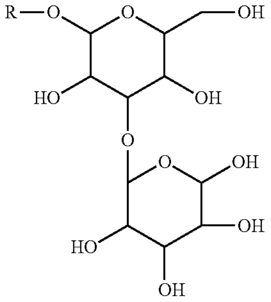

wherein:

R is an alkyl chain having 8 to 22 carbon atoms; a crosslinking agent of the following formula $Cl—CH_2—CH(OH)—CH_2—Cl$;

and a functionalizing agent selected from:

(i)

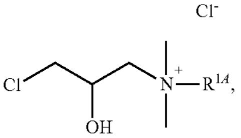

$Cl—CH_2—CH(OH)—SO_3M$, $Cl—CH_2—CH(OH)—SO_4M$, $Cl—CH_2—CH(OH)—CH_2—OP(O)—(OM)_2$, and combinations thereof, wherein $R^{1A}$ is $CH_3(CH_2)_n—$;

(ii) $—Cl—CH_2—C(O)^-Na^+$, 2-halocarboxylic acid, α, β-unsaturated carboxylic acid, cyclic carboxylic acid anhydride, and combinations thereof;

(iii)

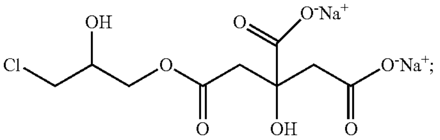

M is a charge balancing group selected from H, Na, K, or $NH_4^+$; and n is an integer from 0-36;

and positional isomers thereof.

Thus, in one embodiment of the present invention is a phosphate and/or sulfonate functionalized alkyl polyglucoside of the following compounds, as a mixture, are useful as surfactants for emulsion polymerization:

(a)

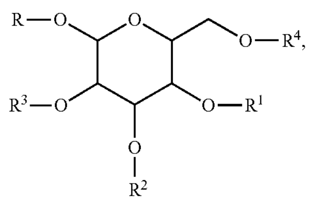

wherein:

R is an alkyl chain having 8 to 22 carbon atoms;

$R^1$, $R^2$, $R^3$, and $R^4$ are independently selected from the group consisting of:

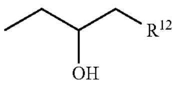

and H, with the proviso that $R^1$, $R^2$, $R^3$, and $R^4$ are not all H;

$R^{12}$ is selected from the group consisting of: —OH, $—SO_3^-M^+$, $—SO_4^{-2}M^+$, and $—O—P(O)—(OM)_2$;

M is selected from the group consisting of Na, K, $NH^4$; and (b)

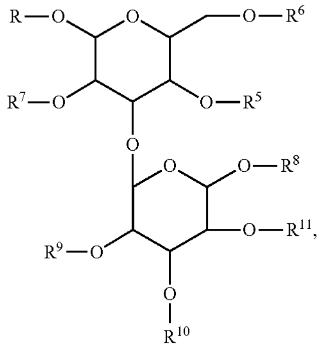

wherein $R^5$, $R^6$, $R^7$, $R^8$, $R^9$, $R^{10}$, and $R^{11}$ are independently selected from the group consisting of:

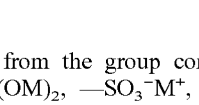

and H; and $R^{12}$ is selected from the group consisting of: —OH, $—O—P(O)—(OM)_2$, $—SO_3^-M^+$, and $—SO_4—^2M^+$, and M is selected from the group consisting of Na, K, $NH^4$;

and positional isomers thereof.

These alkyl polyglucoside surfactants are manufactured by Colonial Chemical, Inc., South Pittsburg, TN 37380. Two examples of which are sodium laurylglucosides hydroxypropylsulfonate (sold under the brand name Suga® Nate 160NC) and sodium decylglucosides hydroxypropylsulfonate (sold under the brand name Suga® Nate 100NC). The alkylpolyglucoside phosphates of the current invention are manufactured by Colonial Chemical, In., South Pittsburg, TN 37380. An example of which is Sodium Decylglucosides Hydroxypropyl Phosphate, sold under the brand name Suga® Fax D10NC.

These surfactants are synthesized by the methods outlined in U.S. Pat. No. 6,627,612 or their corresponding patents and are generally supplied as clear solutions, 30-50% solids, that may be used as is in emulsion polymerization reactions.

The phosphate functionalized alkyl polyglucoside surfactants of this embodiment are also described in U.S. Pat. No. 8,216,994. Thus, phosphate functionalized alkyl polyglucosides of the present invention include those with the following formula:

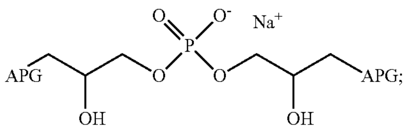

wherein APG is alkyl polyglucoside; and positional isomers thereof. In some embodiments, the alkyl moiety contains about 12 carbon atoms. An example of a suitable phosphate functionalized alkyl polyglucoside includes, but is not limited to, sodium dilaurylglucoside hydroxypropyl phosphate.

The sulfonated functionalized alkyl polyglucoside surfactants of this embodiment are also described in U.S. Pat. No. 8,216,988. Thus, sulfonated functionalized alkyl polyglucosides of the present invention include those with the following formula:

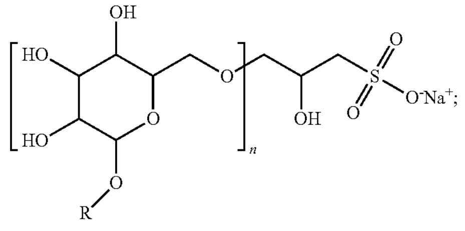

wherein n is between 1 to about 3, and particularly 1.5; and positional isomers thereof. R is an alkyl chain. Examples of suitable sulfonated functionalized alkyl polyglucosides include sodium laurylglucosides hydroxypropyl sulfonate and sodium declyglucosides hydroxypropyl sulfonate and combinations thereof.

An additional embodiment of the present invention is also a glycinate-modified alkylpolyglucoside surfactants represented by compounds of the following formulae, and positional isomers thereof, as a mixture:

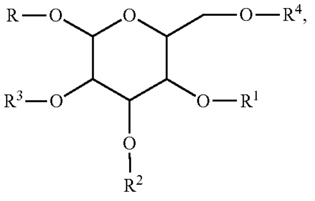

(a)

wherein

R is alkyl having 8 to 22 carbon atoms;

$R^1$, $R^2$, $R^3$, and $R^4$ are independently selected from

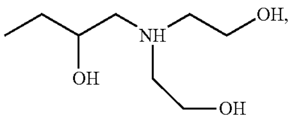

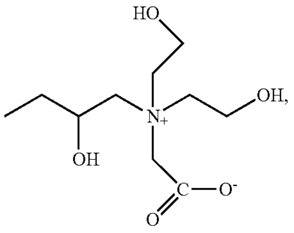

and H, with the proviso that $R^1$, $R^2$, $R^3$, and $R^4$ are not all H;

and

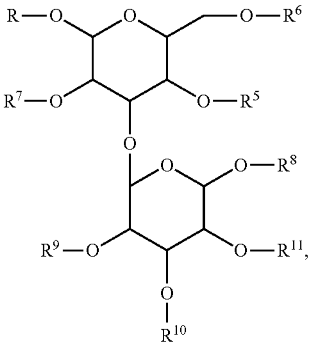

(b)

wherein R is alkyl having 8 to 22 carbon atoms;

$R^5$, $R^6$, $R^7$, $R^8$, $R^9$, $R^{10}$, and $R^{11}$ are independently selected from

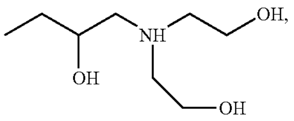

-continued

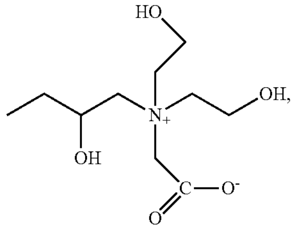

and H, with the proviso that $R^5$, $R^6$, $R^7$, $R^8$, $R^9$, $R^{10}$, and $R^{11}$ are not all H; and positional isomers thereof.

The alkylpolyglucoside glycinates of the current invention are manufactured by Colonial Chemical, Inc., South Pittsburg, TN 37380, two examples of which are Sodium Bis-Hydroxyethylglycinate Coco-Glucosides Crosspolymer (sold under the brand name Poly Suga® Glycinate C) and Sodium Bis-Hydroxyethylglycinate Lauryl-Glucosides Crosspolymer (sold under the brand name Poly Suga® Glycinate L).

These surfactants are synthesized by the methods outlined in U.S. Pat. No. 6,958,315 and are generally supplied as clear solutions, 30-50% solids, that are used as is in emulsion polymerization reactions.

An embodiment of the present invention is also sulfonate-modified, phosphate-modified and cationically modified poly-sugar alkyl polyglucoside surfactants, represented by compounds of the following formulae, as a mixture:

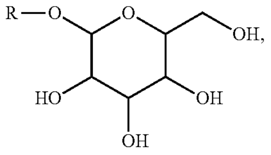

(a)

wherein;

R is alkyl having 8 to 22 carbon atoms; and

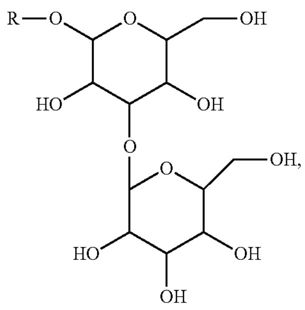

(b)

wherein:

R is alkyl having 8 to 22 carbon atoms;

a crosslinker of the following formula: Cl—$CH_2$—CH(OH)—$CH_2$—Cl; and a functionalizing agent selected from:

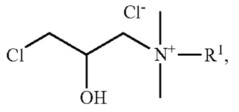

$Cl—CH_2—CH(OH)—SO_3M$, $Cl—CH_2—CH(OH)—SO_4M$, $Cl—CH_2—CH(OH)CH_2—OP(O)—(OM)_2$, and mixtures thereof;

wherein $R^1$ is $CH_3—(CH_2)_n—$;

n is an integer from 0 to 36;

M is a charge balancing group selected from H, Na, K, or $NH_4$; and positional isomers thereof.

These alkyl polyglucosides of the current invention are manufactured by Colonial Chemical, Inc., South Pittsburg, TN 37380, as shown in U.S. Pat. No. 7,507,399. Examples of these alkyl polyglucosides are: sodium hydroxypropyl phosphate decylglucoside crosspolymer (Poly Suga® Phos 1000P), sodium hydroxypropyl phosphate laurylglucoside crosspolymer (PolySuga® Phos 1200P), Sodium hydroxypropyl phosphate cocoglucoside crosspolymer (PolySuga® Phos 8600P), Sodium hydroxypropyl sulfonate butylglucoside crosspolymer (PolySuga® Nate 40P), Sodium hydroxypropyl sulfonate decylglucoside crosspolymer (PolySuga® Nate 100P), Sodium hydroxypropyl sulfonate laurylglucoside crosspolymer (PolySuga® Nate 160P NC), Polyquaternium-78 (Poly Suga® Quat L-1010P), Polyquaternium-80 (Poly Suga® Quat L-1210P) and Polyquaternium-81 (Poly Suga® Quat S-1201P).

Another description of this embodiment is described in U.S. Pat. No. 8,329,633. Thus, poly quaternary functionalized alkyl polyglucosides of the present invention have the following formula:

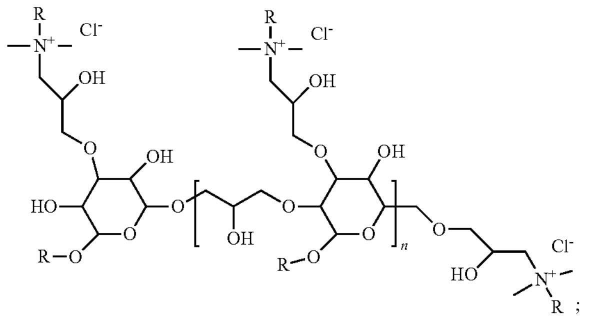

wherein R is an alkyl group having from about 8 to about 22 carbon atoms and n is an integer ranging from 4 to 6; and positional isomers thereof.

Another description of this embodiment is described in U.S. Pat. No. 8,262,805. Thus, poly sulfonate functionalized alkyl polyglucosides of the present invention have the following formula:

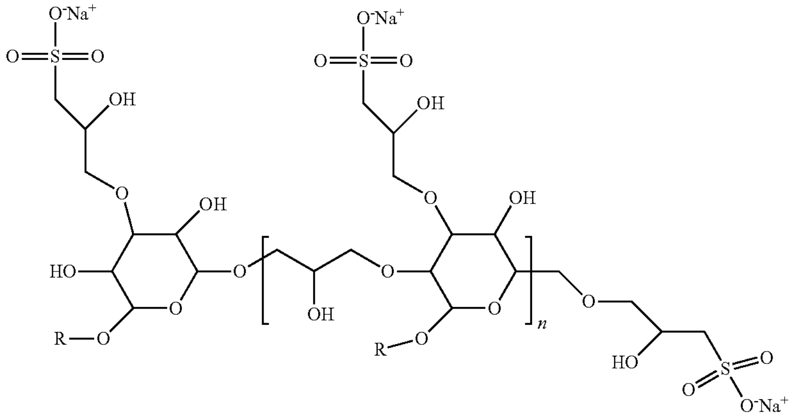

wherein R is an alkyl group having from about 8 to about 22 carbon atoms and n is an integer ranging from 4 to 6; and positional isomers thereof.

Another example of this embodiment is described in U.S. Pat. No. 8,287,659. That is, polyphosphate functionalized alkyl polyglucosides of the following formula:

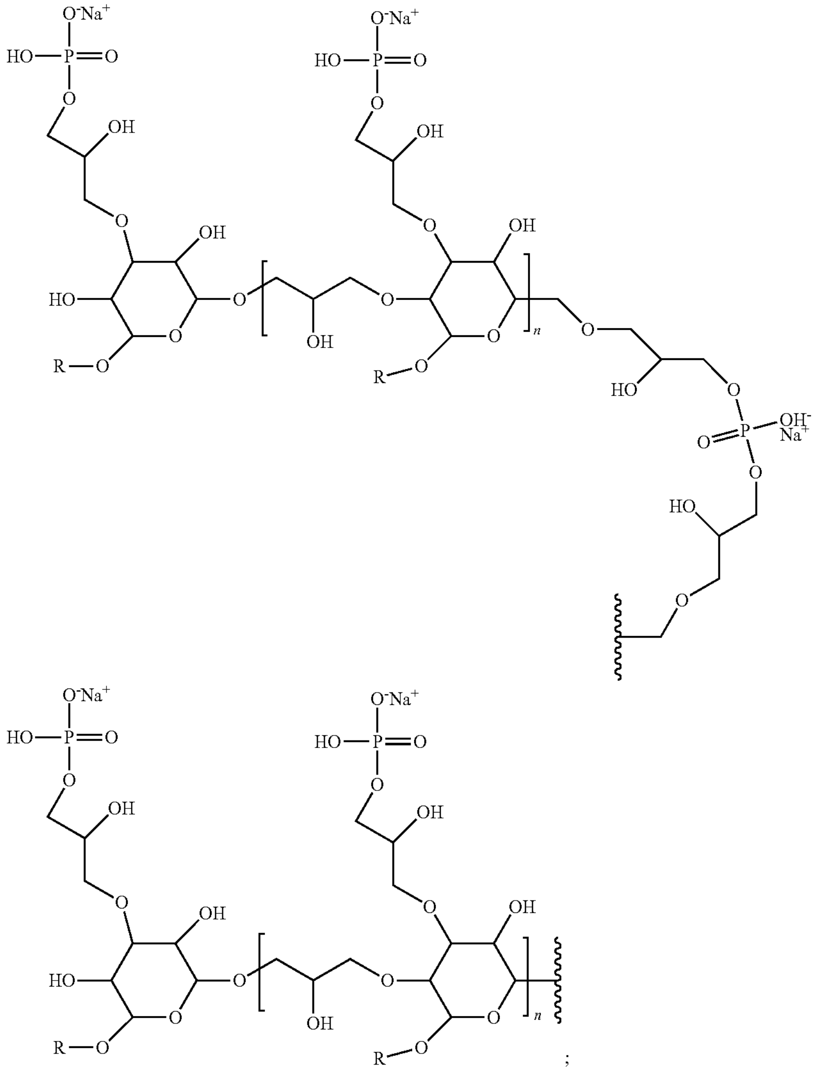

;

wherein R is an alkyl group having from about 8 to about 22 carbon atoms; and positional isomers thereof.

Another surfactant of the present invention is also described in U.S. Pat. Nos. 8,557,760 and 8,389,457. Quaternary functionalized alkyl polyglucosides of the present invention may have the following representative formula:

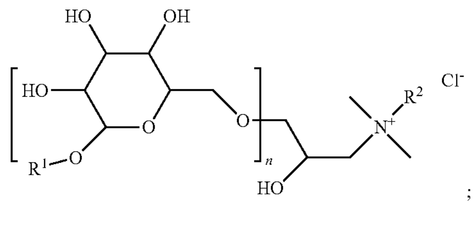

;

wherein $R^1$ is an alkyl group having from about 8 to about 22 carbon atoms, and $R^2$ is $CH_3(CH_2)_n$, and n is independently an integer from 0-21; and positional isomers thereof.

Examples of suitable quaternary functionalized alkyl polyglucosides surfactants include those in the $R^1$ alkyl moiety contains primarily about 12 carbons, the $R^2$ group is $CH_3$.

Embodiments of the present invention are also sulfosuccinate-modified, alkylpolyglucoside surfactants, represented by compounds of the following formulae, as a mixture:

(a)

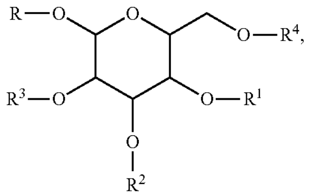

wherein

R is alkyl having 8 to 22 carbon atoms;

$R^1$, $R^2$, $R^3$, and $R^4$ are independently selected from —$CH_2$—CH(OH)—$CH_2$—$R^{12}$, and H, with the proviso that $R^1$, $R^2$, $R^3$, and $R^4$ are not all H;

$R^{12}$ is —O—C(O)—$CH_2$—$CH(SO_3M^+)$—C(O)—$O^-M^+$

M is a charge balancing group selected from H, Na, K, or $NH_4$;

and (b)

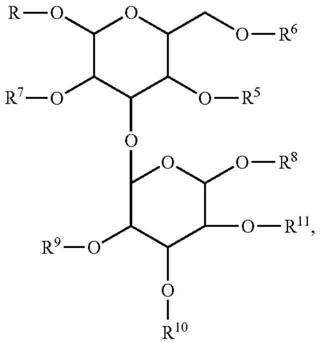

wherein R is alkyl having 8 to 22 carbon atoms;

$R^5$, $R^6$, $R^7$, $R^8$, $R^9$, $R^{10}$, and $R^{11}$ are independently selected from —$CH_2$—CH(OH)—$CH_2$—$R^{12}$, and H, with the proviso that $R^5$, $R^6$, $R^7$, $R^8$, $R^9$, $R^{10}$, and $R^{11}$ are not all H;

$R^{12}$ is —O—C(O)—$CH_2$—$CH(SO_3\ M^+)$—C(O)—$O^-M^+$

M is a charge balancing group selected from H, Na, K, or $NH_4$;

and positional isomers thereof.

The sulfosuccinate-modified Poly Suga® alkylpolyglucosides of the current invention are manufactured by Colonial Chemical, Inc., South Pittsburg, TN 37380. These surfactants are synthesized by the methods outlined in U.S. Pat. No. 7,087,571 and are generally supplied as clear solutions, 30-50% solids, that are used as is in emulsion polymerization reactions.

Another embodiment of the present invention is carboxymethyl-modified, Poly Suga®-alkylpolyglucoside surfactants, represented by the following components, as a mixture:

(a)

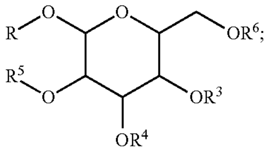

wherein one of $R^3$, $R^4$, $R^5$, and $R^6$ is —$CH_2$—C(O)—$O^-M^+$ or —C(O)—$CH_2$—C(O)—$O^-M^+$, with the remaining R groups being H; R is alkyl having 6 to 30 carbon atoms; M is H, Na, or K; and (b) a 1,3 dicloloro-2-propanol crosslinker;

and positional isomers thereof.

The carboxymethyl-modified Poly Suga® alkyl polyglucosides of the current invention are manufactured by Colonial Chemical, Inc., South Pittsburg, TN 37380, examples of which are Sodium Maleate Decylglucoside Crosspolymer (Poly Suga® Carb DM), Sodium Maleate Laurylglucoside Crosspolymer (Poly Suga® Carb LM) and Sodium Succinate Laurylglucoside Crosspolymer (Poly Suga® Carb LS).

These surfactants are synthesized by the methods outlined in U.S. Pat. No. 7,335,627 and are generally supplied as clear solutions, 40-60% solids, that are used as is in emulsion polymerization reactions.

Another embodiment of the present invention is a citrate-functionalized polymeric alkylglucoside surfactant, represented by the following components, as a mixture:

(a)

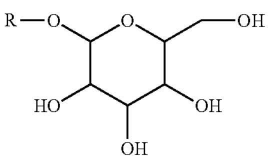

and (b)

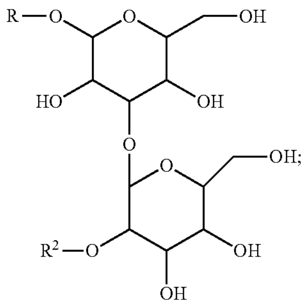

wherein R is an alkyl having 8 to 22 carbons, and $R^2$ is:

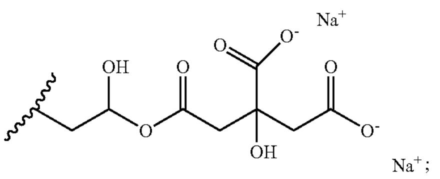 [SMILES: [Na+] ; *CC(O)OC(=O)CC(O)(CC(=O)[O-])C(=O)[O-] ; [Na+] ; ";"]

and positional isomers thereof.

The functionalized alkylpolyglucosides of the present invention have found wide application mostly in the personal care market in various cleansing products such as shampoos, body washes and facial washes.

The composition may include other materials as well. Examples of other materials include water conditioning agents aids, acid sources, solvents, water, additional functional materials, surfactants, thickening agents, bleaching agents, detergent fillers, defoaming agents, antiredeposition agents, stabilizing agents, dispersants, dyes, fragrances, adjuvants, etc.

Examples of these agents are discussed below.

The water conditioning agent aids in removing metal compounds and in reducing harmful effects of hardness components in service water. Exemplary water conditioning agents include chelating agents, sequestering agents and inhibitors. Polyvalent metal cations or compounds such as a calcium, a magnesium, an iron, a manganese, a molybdenum, etc. cation or compound, or mixtures thereof, can be present in service water and in complex soils. Such compounds or cations can interfere with the effectiveness of a washing or rinsing compositions during a cleaning application. A water conditioning agent can effectively complex and remove such compounds or cations from soiled surfaces and can reduce or eliminate the inappropriate interaction with active ingredients including the nonionic surfactants and anionic surfactants of the invention. Both organic and inorganic water conditioning agents are common and can be used. Inorganic water conditioning agents include such compounds as sodium tripolyphosphate and other higher linear and cyclic polyphosphates species. Organic water conditioning agents include both polymeric and small molecule water conditioning agents. Organic small molecule water conditioning agents are typically organocarboxylate compounds or organophosphate water conditioning agents. Polymeric inhibitors commonly comprise polyanionic compositions such as polyacrylic acid compounds. Small molecule organic water conditioning agents include, but are not limited to: sodium gluconate, sodium glucoheptonate, N-hydroxyethylenediaminetriacetic acid (HEDTA), ethylenediaminetetraacetic acid (EDTA), nitrilotriacetic acid (NTA), diethylenetriaminepentaacetic acid (DTPA), ethylenediaminetetraproprionic acid, triethylenetetraaminehexaacetic acid (TTHA), and the respective alkali metal, ammonium and substituted ammonium salts thereof, ethylenediaminetetraacetic acid tetrasodium salt (EDTA), nitrilotriacetic acid trisodium salt (NTA), ethanoldiglycine disodium salt (EDG), diethanolglycine sodium-salt (DEG), and 1,3-propylenediaminetetraacetic acid (PDTA), dicarboxymethyl glutamic acid tetrasodium salt (GLDA), methylglycine-N-N-diacetic acid trisodium salt (MGDA), and iminodisuccinate sodium salt (IDS). All of these are known and commercially available.

The acid source functions to neutralize the water conditioning agent. An example of a suitable acid source includes, but is not limited to, phosphoric acid. The acid source controls the pH of the resulting solution when water is added to the cleaning composition to form a use solution. The pH of the use solution must be maintained in the neutral to slightly alkaline range in order to provide sufficient detergency properties. This is possible because the soil removal properties of the cleaning composition are primarily due to the functionalized alkyl polyglucoside surfactant blends, rather than the alkalinity of the cleaning composition. In one embodiment, the pH of the use solution is between approximately 6.5 and approximately 10. In particular, the pH of the use solution is between approximately 8 and approximately 9. If the pH of the use solution is too low, for example, below approximately 6, the use solution may not provide adequate detergency properties. If the pH of the use solution is too high, for example, above approximately 11, the use solution may be too alkaline and attack or damage the surface to be cleaned.

A solvent is often times useful in cleaning compositions to enhance soil removal properties. The cleaning compositions of the invention may include a solvent to adjust the viscosity of the final composition. The intended final use of the composition may determine whether or not a solvent is included in the cleaning composition. If a solvent is included in the cleaning composition, it is usually a low cost solvent such as isopropyl alcohol. A solvent may or may not be included to improve soil removal, handleability or ease of use of the compositions of the invention. Suitable solvents useful in removing hydrophobic soils include, but are not limited to: oxygenated solvents such as lower alkanols, lower alkyl ethers, glycols, aryl glycol ethers and lower alkyl glycol ethers. Examples of other solvents include, but are not limited to: methanol, ethanol, propanol, isopropanol and butanol, isobutanol, ethylene glycol, diethylene glycol, triethylene glycol, propylene glycol, dipropylene glycol, mixed ethylene-propylene glycol ethers, ethylene glycol phenyl ether, and propylene glycol phenyl ether. Substantially water soluble glycol ether solvents include, not are not limited to: propylene glycol methyl ether, propylene glycol propyl ether, dipropylene glycol methyl ether, tripropylene glycol methyl ether, ethylene glycol butyl ether, diethylene glycol methyl ether, diethylene glycol butyl ether, ethylene glycol dimethyl ether, ethylene glycol propyl ether, diethylene glycol ethyl ether, triethylene glycol methyl ether, triethylene glycol ethyl ether, triethylene glycol butyl ether and the like.

The cleaning composition also includes water. It should be appreciated that the water may be provided as deionized water or as softened water. The water provided as part of the concentrate can be relatively free of hardness. It is expected that the water can be deionized to remove a portion of the dissolved solids. That is, the concentrate can be formulated with water that includes dissolved solids, and can be formulated with water that can be characterized as hard water.

In one embodiment, the cleaning compositions of the present invention are free or substantially free of APEs, making the detergent composition more environmentally acceptable. APE-free refers to a composition, mixture, or ingredients to which APEs are not added. Should APEs be present through contamination of an APE-free composition, mixture, or ingredient, the level of APEs in the resulting composition is less than approximately 0.5 wt. %, less than approximately 0.1 wt %, and often less than approximately 0.01 wt. %.

Additional Functional Materials: The cleaning compositions can include additional components or agents, such as additional functional materials. The functional materials provide desired properties and functionalities to the cleaning composition. For the purpose of this application, the term "functional materials" include a material that when dispersed or dissolved in a use and/or concentrate solution, such as an aqueous solution, provides a beneficial property in a particular use. Thus, the cleaning preparations of the present invention may optionally contain other soil-digesting components, surfactants, disinfectants, sanitizers, acidulants, complexing agents, corrosion inhibitors, foam inhibitors, dyes, thickening or gelling agents, and perfumes, as described, for example, in U.S. Pat. No. 7,341,983, incorporated herein by reference. Some particular examples of functional materials are discussed in more detail below, but it should be understood by those of skill in the art and others that the particular materials discussed are given by way of example only, and that a broad variety of other functional materials may be used. For example, many of the functional materials discussed below relate to materials used in cleaning and/or destaining applications, but it should be understood that other embodiments may include functional materials for use in other applications.

Surfactants: The cleaning composition can contain anionic surfactant components in addition to the anionic alkylpolyglucosides of the current invention that includes a detersive amount of an anionic surfactant or a mixture of anionic surfactants. Anionic surfactants may be desirable in cleaning compositions because of their wetting and detersive properties. The anionic surfactants that can be used according to the invention include any anionic surfactant available in the cleaning industry. Suitable groups of anionic surfactants include sulfonates and sulfates. Suitable surfactants that can be provided in the anionic surfactant component include alkyl aryl sulfonates, secondary alkane sulfonates, alkyl methyl ester sulfonates, alpha olefin sulfonates, alkyl ether sulfates, alkyl sulfates, and alcohol sulfates.

Suitable alkyl aryl sulfonates that can be used in the cleaning composition can have an alkyl group that contains 6 to 24 carbon atoms and the aryl group can be at least one of benzene, toluene, and xylene. A suitable alkyl aryl sulfonate includes linear alkyl benzene sulfonate. A suitable linear alkyl benzene sulfonate includes linear dodecyl benzyl sulfonate that can be provided as an acid that is neutralized to form the sulfonate. Additional suitable alkyl aryl sulfonates include xylene sulfonate and cumene sulfonate. Suitable alkane sulfonates that can be used in the cleaning composition can have an alkane group having 6 to 24 carbon atoms. Suitable alkane sulfonates that can be used include secondary alkane sulfonates. A suitable secondary alkane sulfonate includes sodium C14-C17 secondary alkyl sulfonate commercially available as Hostapur SAS from Clariant.

Suitable alkyl methyl ester sulfonates that can be used in the cleaning composition include those having an alkyl group containing 6 to 24 carbon atoms. Suitable alpha olefin sulfonates that can be used in the cleaning composition include those having alpha olefin groups containing 6 to 24 carbon atoms.

Suitable alkyl ether sulfates that can be used in the cleaning composition include those having between about 1 and about 10 repeating alkoxy groups, between about 1 and about 5 repeating alkoxy groups. In general, the alkoxy group will contain between about 2 and about 4 carbon atoms. A suitable alkoxy group is ethoxy. A suitable alkyl ether sulfate is sodium lauryl ether sulfate and is available under the name Colonial SLES-2.

Suitable alkyl sulfates that can be used in the cleaning composition include those having an alkyl group containing 6 to 24 carbon atoms. Suitable alkyl sulfates include, but are not limited to, sodium lauryl sulfate and sodium lauryl/myristyl sulfate.

Suitable alcohol sulfates that can be used in the cleaning composition include those having an alcohol group containing about 6 to about 24 carbon atoms.

The additional anionic surfactant can be neutralized with an alkaline metal salt, an amine, or a mixture thereof. Suitable alkaline metal salts include sodium, potassium, and magnesium. Suitable amines include monoethanolamine, triethanolamine, and monoisopropanolamine. If a mixture of salts is used, a suitable mixture of alkaline metal salt can be sodium and magnesium, and the molar ratio of sodium to magnesium can be between about 3:1 and about 1:1.

The cleaning composition, when provided as a concentrate, can include the additional anionic surfactant component in an amount sufficient to provide a use composition having desired wetting and detersive properties after dilution with water. The concentrate can contain about 0.1 wt. % to about 0.5 wt. %, about 0.1 wt. % to about 1.0 wt. %, about 1.0 wt. % to about 5 wt. %, about 5 wt. % to about 10 wt. %, about 10 wt. % to about 20 wt. %, 30 wt. %, about 0.5 wt. % to about 25 wt. %, and about 1 wt. % to about 15 wt. %, and similar intermediate concentrations of the anionic surfactant.

The cleaning composition can contain a nonionic surfactant component in addition to the nonionic alkyl polyglucoside crosspolymer surfactants of the present invention that includes a detersive amount of nonionic surfactant or a mixture of nonionic surfactants. These additional surfactants can be included in the cleaning composition to enhance grease removal properties, for example.

These additional nonionic surfactants that can be used in the composition include polyalkylene oxide surfactants (also known as polyoxyalkylene surfactants or polyalkylene glycol surfactants). Suitable polyalkylene oxide surfactants include polyoxypropylene surfactants and polyoxyethylene glycol surfactants. Suitable surfactants of this type are synthetic organic polyoxypropylene (PO)-polyoxyethylene (EO) block copolymers. These surfactants include a di-block polymer comprising an EO block and a PO block, a center block of polyoxypropylene units (PO), and having blocks of polyoxyethylene grafted onto the polyoxypropylene unit or a center block of EO with attached PO blocks. Further, this surfactant can have further blocks of either polyoxyethylene or polyoxypropylene in the molecules. A suitable average molecular weight range of useful surfactants can be about 1,000 to about 40,000 and the weight percent content of ethylene oxide can be about 10-80 wt %.

The additional nonionic surfactants may also include alcohol alkoxylates. An suitable alcohol alkoxylate include linear alcohol ethoxylates such as Tomadol™ 1-5 which is a surfactant containing an alkyl group having 11 carbon atoms and 5 moles of ethylene oxide. Additional alcohol alkoxylates include alkylphenol ethoxylates, branched alcohol ethoxylates, secondary alcohol ethoxylates (e.g., Tergitol 15-S-7 from Dow Chemical), castor oil ethoxylates, alkylamine ethoxylates, tallow amine ethoxylates, fatty acid ethoxylates, sorbital oleate ethoxylates, end-capped ethoxylates, or mixtures thereof. Additional nonionic surfactants include amides such as fatty alkanolamides, alkyldiethanolamides, coconut diethanolamide, lauric diethanolamide, polyethylene glycol cocoamide (e.g., PEG-6 cocoamide), oleic diethanolamide, or mixtures thereof. Additional suitable nonionic surfactants include polyalkoxylated aliphatic base, polyalkoxylated amide, glycol esters, glycerol esters, amine oxides, quaternary esters, alcohol quaternary, fatty triglycerides, fatty triglyceride esters, alkyl ether quaternary, alkyl esters, alkyl phenol ethoxylate quaternary esters, alkyl polysaccharides, block copolymers, alkyl polyglucosides, or mixtures thereof.

Amphoteric surfactants can also be used to provide desired detersive properties.

Suitable amphoteric surfactants that can be used include, but are not limited to: betaines, imidazolines, and propionates. Suitable amphoteric surfactants include, but are not limited to: sultaines, amphopropionates, amphodipropionates, aminopropionates, aminodipropionates, amphoacetates, amphodiacetates, and amphohydroxypropylsulfonates.

When the detergent composition includes an amphoteric surfactant, the amphoteric surfactant can be included in an amount of about 0.1 wt % to about 15 wt %. The concentrate can include about 0.1 wt % to about 1.0 wt %, 0.5 wt % to about 12 wt % or about 2 wt % to about 10 wt % of the amphoteric surfactant.

The cleaning compositions of the present invention may also contain a cationic co-surfactant component that includes a detersive amount of cationic surfactant or a mixture of cationic surfactants. Cationic co-surfactants that can be used in the cleaning composition include, but are not limited to: amines such as primary, secondary and tertiary monoamines with C18 alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and poly quaternary ammonium salts, as for example, alkylpoly quaternary ammonium chloride surfactants such as n-alkyl($C_{12}$-$C_{18}$) dimethylbenzyl ammonium chloride, n-tetradecyldimethylbenzylammonium chloride monohydrate, and a naphthylene-substituted poly quaternary ammonium chloride such as dimethyl-1-naphthylmethylammonium chloride.

Thickening Agents: The viscosity of the cleaning composition increases with the amount of thickening agent, and viscous compositions are useful for uses where the cleaning composition clings to the surface. Suitable thickeners can include those which do not leave contaminating residue on the surface to be treated. Generally, thickeners which may be used in the present invention include natural gums such as xanthan gum, guar gum, modified guar, or other gums from plant mucilage; polysaccharide based thickeners, such as alginates, starches, and cellulosic polymers (e.g., carboxymethyl cellulose, hydroxyethyl cellulose, and the like); polyacrylates thickeners; and hydrocolloid thickeners, such as pectin. Generally, the concentration of thickener employed in the present compositions or methods will be dictated by the desired viscosity within the final composition. However, as a general guideline, the viscosity of thickener within the present composition ranges from about 0.1 wt. % to about 3 wt. %, from about 0.1 wt. % to about 2 wt. %, or about 0.1 wt. % to about 0.5 wt. %.

Bleaching Agents: The cleaning composition may also include bleaching agents for lightening or whitening a substrate. Examples of suitable bleaching agents include bleaching compounds capable of liberating an active halogen species, such as Cl2, Br2, —OCl— and/or —OBr—, under conditions typically encountered during the cleansing process. Suitable bleaching agents for use in the present cleaning compositions include, for example, chlorine-containing compounds such as a chlorine, a hypochlorite, and chloramine. Exemplary halogen-releasing compounds include the alkali metal dichloroisocyanurates, chlorinated trisodium quaternary, the alkali metal hypochlorites, monochloramine and dichloramine, and the like. Encapsulated chlorine sources may also be used to enhance the stability of the chlorine source in the composition (see, for example, U.S. Pat. Nos. 4,618,914 and 4,830,773, the disclosures of which are incorporated by reference herein for all purposes). A bleaching agent may also be a peroxygen or active oxygen source such as hydrogen peroxide, perborates, sodium carbonate peroxyhydrate, quaternary peroxyhydrates, potassium permonosulfate, and sodium perborate mono and tetrahydrate, with and without activators such as tetraacetylethylene diamine, and the like. The composition can include an effective amount of a bleaching agent. When the concentrate includes a bleaching agent, it can be included in an amount of about 0.1 wt. % to about 60 wt. %, about 1 wt. % to about 20 wt. %, about 3 wt. % to about 8 wt. %, and about 3 wt. % to about 6 wt. %.

Detergent Fillers: The cleaning composition can include an effective amount of detergent fillers, which does not perform as a cleaning agent per se, but cooperates with the cleaning agent to enhance the overall cleaning capacity of the composition. Examples of detergent fillers suitable for use in the present cleaning compositions include sodium sulfate, sodium chloride, starch, sugars, C1-C10 alkylene glycols such as propylene glycol, and the like. When the concentrate includes a detergent filler, it can be included in an amount of between about 1 wt % and about 20 wt % and between about 3 wt % and about 15 wt %.

Defoaming Agents: The cleaning composition can include a defoaming agent to reduce the stability of foam and reduce foaming. When the concentrate includes a defoaming agent, the defoaming agent can be provided in an amount of between about 0.01 wt. % and about 3 wt. %.

Examples of defoaming agents that can be used in the composition includes ethylene oxide/propylene oxide block copolymers such as those available under the name Pluronic N3, silicone compounds such as silica dispersed in polydimethylsiloxane, polydimethylsiloxane, and functionalized polydimethylsiloxane such as those available under the name Abil B9952, fatty amides, hydrocarbon waxes, fatty acids, fatty esters, fatty alcohols, fatty acid soaps, ethoxylates, mineral oils, polyethylene glycol esters, alkyl quaternary esters such as monostearyl quaternary, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein for all purposes.

Antiredeposition Agents: The cleaning composition can include an anti-redeposition agent for facilitating sustained suspension of soils in a cleaning solution and preventing the removed soils from being redeposited onto the substrate being cleaned. Examples of suitable anti-redeposition agents include fatty acid amides, fluorocarbon surfactants, complex quaternary esters, styrene maleic anhydride copolymers, and cellulosic derivatives such as hydroxyethyl cellulose, hydroxypropyl cellulose, and the like. When the concentrate includes an anti-redeposition agent, the anti-redeposition agent can be included in an amount of between about 0.5 wt % and about 10 wt % and between about 1 wt % and about 5 wt %.

Stabilizing Agents: Stabilizing agents that can be used in the cleaning composition include, but are not limited to: primary aliphatic amines, betaines, borate, calcium ions, sodium citrate, citric acid, sodium formate, glycerine, malonic acid, organic diacids, polyols, propylene glycol, and mixtures thereof. The concentrate need not include a stabilizing agent, but when the concentrate includes a stabilizing agent, it can be included in an amount that provides the desired level of stability of the concentrate. Exemplary ranges of the stabilizing agent include up to about 20 wt %, between about 0.5 wt. % to about 15 wt. % and between about 2 wt. % to about 10 wt. %.

Dispersants: Dispersants that can be used in the cleaning composition include maleic acid/olefin copolymers, polyacrylic acid, and its copolymers, and mixtures thereof. The concentrate need not include a dispersant, but when a dispersant is included it can be included in an amount that provides the desired dispersant properties. Exemplary ranges of the dispersant in the concentrate can be up to about 20 wt. %, between about 0.5 wt. % and about 15 wt. %, and between about 2 wt. % and about 9 wt. %.

Dyes and Fragrances: Various dyes, odorants including perfumes, and other aesthetic enhancing agents may also be included in the cleaning composition. Dyes may be included to alter the appearance of the composition, as for example, any of a variety of FD&C dyes, D&C dyes, and the like. Additional suitable dyes include Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keystone Aniline and Chemical), Metanil Yellow (Keystone Aniline and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (BASF), Pylakor Acid Bright Red (Pylam), and the like.

Fragrances or perfumes that may be included in the compositions include, for example, terpenoids such as citronellol, aldehydes such as amyl cinnamaldehyde, a jasmine such as C1S-jasmine or jasmal, vanillin, and the like.

Adjuvants: The present composition can also include any number of adjuvants. Specifically, the cleaning composition can include stabilizing agents, wetting agents, thickeners, foaming agents, corrosion inhibitors, biocides, hydrogen peroxide, pigments or dyes among any number of other constituents which can be added to the composition. Such adjuvants can be pre-formulated with the present composition or added to the system simultaneously, or even after, the addition of the present composition. The cleaning composition can also contain any number of other constituents as necessitated by the application, which are known and which can facilitate the activity of the present compositions.

Another embodiment of the present invention is a method of cleaning a surface, comprising applying an effective cleaning amount of a cleaning composition that comprises a nonionic sorbitan alkyl polyglucoside crosspolymer, at least one functionalized alkyl polyglucoside, a water conditioning agent, water, and an acid source. On one aspect, the surface has a food or soil product that is desired to be removed. In another aspect, the surface has a grease product that is desired to be removed.

The composition of the present invention can be prepared in a concentrated form, and diluted in water prior to application.

EXAMPLES

The following is presented for exemplary purposes only. It is not intended to be construed as limiting the present invention.

Example 1: Soil Removal

In order to demonstrate/determine the superior cleaning ability of surfactant blends containing sorbitan oleate decylglucoside crosspolymer on food soil, the following process was used. Standard microscope slides were cast with the following food soil formula:

39.2%—Corn Oil
39.2%—Lard
19.6%—Egg Powder
2.0%—Red Dye.

The slides were dipped in the above solution three times to ensure an even coating, after slides were dipped they were placed in an upright position to dry overnight (~12-16 hours). Once slides were dried and ready for testing, the concentrate cleaning solutions in Table 1 were prepared (at the 18% actives level) and diluted to 1.2% final test solutions with water. These diluted test solutions were placed in a 150 mL beaker with a magnetic stir bar and mixed at the same rate. The slides with food soil were placed in these beakers of the stirred cleaning solutions (1.2% actives) and observed for cleaning. Slides were evaluated at intervals of 2 minutes, all slides were observed at each point and given a percent clean value. Percent clean and time were the two parameters used to determine cleaning ability of the solutions. In all cases in Table 1, the "as is" strength of the commercial surfactant is in the parentheses following the name

TABLE 1

Concentrate formulations used for soil cleaning experiments

| | Control 1 | Soln 1 | Soln 2 | Soln 3 | Soln 4 | Soln 5 | Soln 6 |
|---|---|---|---|---|---|---|---|
| Water | 31.03 | 63.29 | 63.1 | 47.17 | 54.8 | 54.8 | 54.8 |
| IPA | 2.5 | 2.5 | 2.5 | 2.5 | 2.5 | 2.5 | 2.5 |
| Phosphoric | 0.47 | 0.51 | 0.5 | 0.63 | 0.5 | 0.5 | 0.5 |
| Poly Suga ® Quat L1210P (30%) | 60 | | | 30 | | | |
| Glucopon 215 (63.5%) | | | 14.2 | | | | |
| Suga ® Nate 160NC (40%) | | | | | 22.5 | | |
| Poly Suga ® Mulse D9 (65%) | | 27.7 | 13.7 | 13.7 | 13.7 | 13.7 | 13.7 |
| Poly Suga ® Nate 160P (40%) | | | | | | | 22.5 |
| Suga ® Fax D10NC (40%) | | | | | | 22.5 | |
| EDTA | 6 | 6 | 6 | 6 | 6 | 6 | 6 |
| TOTAL | 100 | 100 | 100 | 100 | 100 | 100 | 100 |

The control 1 concentrate formulation in Table 1 above is one of the same formulas described in Table 1 (Column 12), and Table 9 (Column 19) in U.S. Pat. No. 8,329,633 (assigned to Ecola USA Inc). This formula contains Poly Suga® Quat S1201P (Colonial Chemical, Inc.) at 18%. A diluted version of this concentration (1.2% actives) was found to completely clean the food-soiled slides described above in approximately 10 minutes (Table 2). When half of this surfactant concentrate was replaced with 9% sorbitan oleate decylglucoside crosspolymer (Solution 3, Table 1) and the dilution and cleaning experiment was repeated, it was observed that 100% cleaning was achieved in 6 minutes (Table 2, diluted Soln 3). As mentioned above, this is surprising because when Diluted Solution 1 (containing only sorbitan oleate decylglucoside crosspolymer, PolySuga® Mulse D9, a nonionic surfactant) was tested under the same conditions, 100% cleaning was only achieved in about 25 minutes, essentially 2.5 times longer than the Diluted Control 1 time. Additionally, when it was attempted to boost the cleaning power of sorbitan oleate decylglucoside crosspolymer by combining it with another nonionic surfactant, an alkylpolyglucoside (Glucopon 215, BASF), the cleaning time was improved to 18 minutes (Table 2, Diluted Solution 2), but still well in excess of the cleaning times of the cationic and anionic functionalized alkyl polyglucosides alone.

This same synergy between sorbitan oleate decylpolyglucoside crosspolymer and other cationic or anionic functionalized alkyl polyglucosides is further demonstrated in Table 2 by diluted Solution 4 (50:50 blend with sulfonate-functionalized Suga® Nate 160NC), by Diluted Solution 5 (50:50 blend with phosphate-functionalized Suga® Fax D10NC), and by Diluted Solution 6 (50:50 blend with sulfonate-functionalized PolySuga® Nate 160P.

TABLE 2

Soil Cleaning Results of diluted test Formulations (1.2% actives) from Table 1-Percent Soil Removed

| | Time (Minutes) | | | | | | | | | | | | | | |
|---|---|---|---|---|---|---|---|---|---|---|---|---|---|---|---|
| | 2 | 4 | 6 | 8 | 10 | 12 | 14 | 15 | 16 | 18 | 20 | 22 | 24 | 25 | 26 |
| Diluted Control 1 | 50 | 65 | 80 | 95 | 100 | | | | | | | | | | |
| Diluted Soln 1 | 30 | — | — | 50 | 55 | — | — | 60 | — | — | 70 | — | — | 100 | |
| Diluted Soln 2 | 50 | 70 | 75 | 85 | 90 | 95 | 95 | | 95 | 100 | | | | | |
| Diluted Soln 3 | 60 | 95 | 100 | | | | | | | | | | | | |
| Diluted Soln 4 | 65 | 95 | 100 | | | | | | | | | | | | |
| Diluted Soln 5 | 50 | 80 | 95 | 100 | | | | | | | | | | | |
| Diluted Soln 6 | 40 | 80 | 95 | 100 | | | | | | | | | | | |
| Diluted Control 1 | 50 | 65 | 80 | 95 | 100 | | | | | | | | | | |

These are examples of Suga®- and PolySuga®-surfactants that when formulated with nonionic surfactant Poly Suga® Mulse D9 were found to have enhanced cleaning power compared to when they were used alone as cleaning agents.

Example 2: Grease Removal

The aforementioned blends of sorbitan oleate decylpolyglucoside crosspolymer with cationic or anionic functionalized alkyl polyglucosides are also effective cleaning solutions for industrial grease.

In order to demonstrate/determine the superior cleaning ability of surfactant blends containing sorbitan oleate decylglucoside crosspolymer on industrial grease, the following process was used. Standard microscope slides were cast with the following grease formula:

| | |
|---|---|
| Motor Oil | 43.9 |
| Lithium Grease | 21.7 |
| Heptane | 32.1 |
| Carbon Black | 2.3 |

The slides were dipped in the above grease solution three times to ensure an even coating, after slides were dipped they were placed in an upright position to dry overnight (~12-16 hours). Once slides were dried and ready for testing, the solutions in Table 3 were placed in a 150 mL beaker with a magnetic stir bar and mixed at the same rate. Once homogenous and dry, the slides with industrial grease were placed in the beakers of the stirred cleaning solutions and observed for cleaning. Slides were evaluated at intervals of 5 minutes, all slides were observed at each point and given a percent clean value. Percent clean and time were the two parameters used to determine cleaning ability of the solutions in Table 4.

TABLE 3

Formulations evaluated for industrial degreasing

| | Control 2 (NP-9) | Soln 7 | Soln 8 |
|---|---|---|---|
| Water | qs | qs | qs |
| Sodium Metasilicate | 3.0 | 3.0 | 3.0 |
| Sodium Gluconate | 2.0 | 2.0 | 2.0 |
| Poly Suga ®Quat L1210P (30%) | | 8.33 | |
| KOH, 45% | 1.0 | 1.0 | 1.0 |
| Suga ®Nate 160NC (40%) | | | 6.25 |
| Poly Suga ®Mulse D9 (65%) | | 3.85 | 3.85 |
| NP-9 | 5.0 | | |
| EDTA, 40% | 1.0 | 1.0 | 1.0 |
| TOTAL | 100 | 100 | 100 |

TABLE 4

Grease removal results of test formulations from Table 3-Percent Grease Removed

| | Time (Minutes) | | | | | | | |
|---|---|---|---|---|---|---|---|---|
| | 5 | 10 | 20 | 30 | 40 | 46 | 50 | 60 |
| Control 2 (NP-9) | 0 | 5 | 40 | 80 | 100 | | | |
| Soln 7 | 0 | 5 | 40 | 70 | 100 | | | |
| Soln 8 | 0 | 10 | 45 | 60 | 70 | — | 100 | |

TABLE 4-continued

| Grease removal results of test formulations from Table 3-Percent Grease Removed | | | | | | | | |
|---|---|---|---|---|---|---|---|---|
| | Time (Minutes) | | | | | | | |
| | 5 | 10 | 20 | 30 | 40 | 46 | 50 | 60 |
| Control 2 (NP-9) | 0 | 5 | 40 | 80 | 100 | | | |

Control 2 solution in the degreasing experiments was NP-9, nonylphenol 9-mole ethoxylate, at an actives level of 5%. As previously mentioned in the Background section, alkyl phenol ethoxylates (APEs) are used in detergents as a cleanser and in degreasers for their effectiveness at removing soils containing grease. Test Solution 7 also contained a surfactant actives level of 5%, however 2.5% of the actives came from Poly Suga® Quat L1210P and 2.5% of the actives came from Poly Suga® Mulse D9 which was shown in the soil removal experiments to be ineffective. However, the presence of Poly Suga® Mulse D9 in Test Solution 7 allows the level of quat actives to be reduced to 2.5% to provide the same level of cleaning as 5% NP-9.

Various publications, including US patent documents are referenced. All such documents are incorporated herein by reference in their entirety.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers. Additionally, unless expressly described as "unsubstituted", all substituents can be substituted or unsubstituted.

The invention thus being described, it will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only.

We claim:

1. A cleaning composition comprising:

a nonionic sorbitan alkyl polyglucoside crosspolymer in an amount of from about 9% to 80% by weight;

at least one functionalized anionic or cationic alkyl polyglucoside;

a water conditioning agent;

water; and an acid source.

2. The composition of claim 1, wherein:

the at least one functionalized anionic or cationic alkyl polyglucoside is present from about 1.7% to 80% by weight;

the water conditioning agent is present from about 0.38% to about 18% by weight;

water is present to make 100% by weight; and the acid source is present from about 0.028% to about 0.55% by weight.

3. The cleaning composition of claim 1, wherein, based on the total weight of the composition:

the nonionic sorbitan alkyl polyglucoside crosspolymer is present in an active amount of from about 0.5% to about 52%; and the at least one functionalized anionic or cationic alkyl polyglucoside is present in an active amount of from about 0.5% to about 32%.

4. The composition of claim 1, wherein the nonionic alkyl polyglucoside crosspolymer is a sorbitan alkyl polyglucoside crosspolymer.

5. The composition of claim 4, wherein the sorbitan alkyl polyglucoside crosspolymer is a sorbitan oleate polyglucoside crosspolymer.

6. The composition of claim 1, wherein the nonionic alkyl polyglucoside crosspolymer is derived from a renewable carbon source chosen from a sulfonate, phosphate, quaternized, and/or sulfosuccinate alkyl polyglucosides.

7. The composition of claim 1, wherein the sorbitan alkyl polyglucoside crosspolymer is a sorbitan oleate polyglucoside crosspolymer.

8. The composition of claim 1, wherein the functionalized alkyl polyglucoside is one or more of the following functionalized alkyl polyglucosides: quaternary functionalized alkyl polyglucoside, poly quaternary functionalized alkyl polyglucosides, sulfonated functionalized alkyl polyglucoside, poly sulfonate functionalized alkyl polyglucoside, phosphate functionalized alkyl polyglucosides, poly phosphate functionalized alkyl polyglucosides, betaine functionalized alkyl polyglucosides, poly betaine functionalized alkyl polyglucosides, sulfosuccinate functionalized alkyl polyglucosides, poly sulfosuccinate functionalized alkyl polyglucosides, and citrate functionalized alkyl polyglucoside.

9. The composition of claim 1, wherein the composition is free of nonyl phenol alkoxylates.

10. The composition of claim 1, wherein the water conditioning agent is EDTA.

11. The composition of claim 1, wherein the acid source is phosphoric acid.

12. The composition of claim 1, wherein the nonionic sorbitan alkyl polyglucoside crosspolymer includes the following, as a mixture:

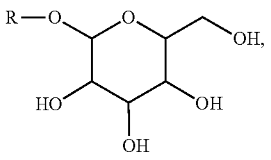

(a)

wherein;

R is alkyl having 8 to 22 carbon atoms; and (b)

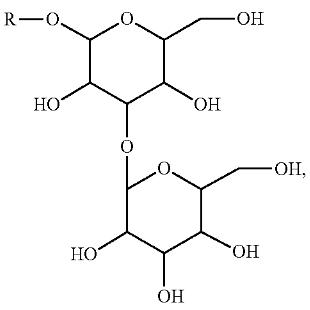

wherein:

R is alkyl having 8 to 22 carbon atoms; and (c) a sorbitan ester of the following structure:

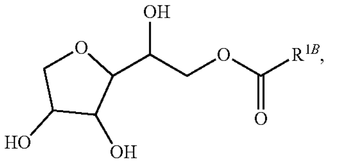

wherein:

$R^{1B}$ is alkyl having 7 to 21 carbons;

a crosslinking agent of the following structure:

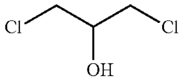

in water; and optionally a functionalizing agent selected from the group of:

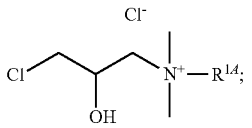

Cl—$CH_2$—CH(OH)—$SO_3$M;

Cl—$CH_2$—CH(OH)—$SO_4$M;

Cl—$CH_2$—CH(OH)$CH_2$—OP(O)—$(OM)_2$;

and mixtures thereof;

wherein $R^{1A}$ is $CH_3$—$(CH_2)_n$, n is an integer from 0 to 36;

M is a charge balancing group selected from H, Na, K, or $NH_4$;

and positional isomers thereof.

13. The composition of claim 1, wherein the functionalized alkyl polyglucoside is a composition that includes the following, as a mixture:

(a)

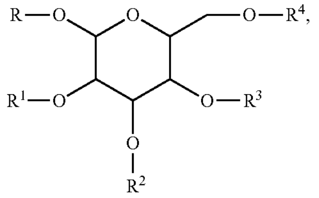

and (b)

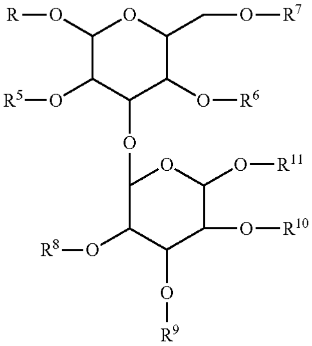

wherein:

R is an alkyl chain having 8 to 22 carbon atoms;

$R^1$, $R^2$, $R^3$, $R^4$ $R^5$, $R^6$, $R^7$, $R^8$, $R^9$, $R^{10}$, and $R^{11}$ are independently selected from the group consisting of: —$CH_2$—C(O)—$O^-M^+$, or —C(O)$CH_2$—C(O)—$O^-$ $M^+$

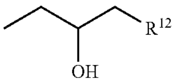

and H, with the proviso that $R^1$-$R^{11}$ are not all H;

$R^{12}$ is selected from the group consisting of:

—OH, —$SO_3^-M^+$, and —$SO_4^{-2}M^+$, —O—P(O)—$(OM)_2$,

—$N(CH_3)_2$—$R^{1A}$, —O—C(O)—$CH_2$—OH($SO_3^-M^+$)—C(O)—$O^-M^+$,

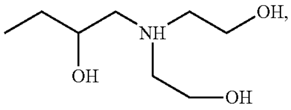

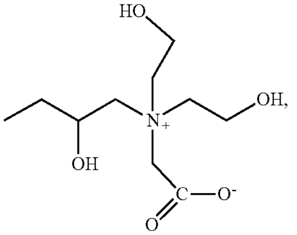

and

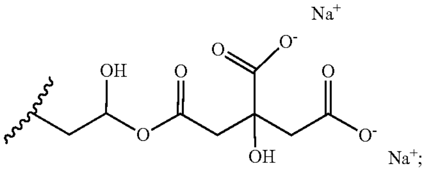

$R^{1A}$ is $CH_3$—$(CH_2)_n$—;

M is a charge balancing group selected from H, Na, K, or $NH_4^+$; and n is an integer from 0-36;

and positional isomers thereof.

14. The composition of claim 1, wherein the functionalized alkyl polyglucoside includes the following, as a mixture:

(a)

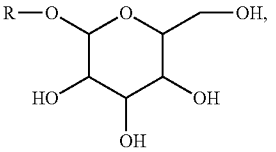

and (b)

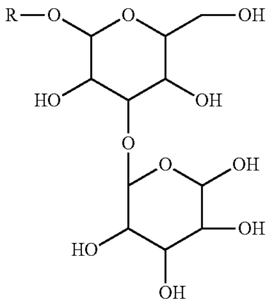

wherein:

R is an alkyl chain having 8 to 22 carbon atoms;

a crosslinking agent of the following formula Cl—$CH_2$—CH(OH)—$CH_2$—Cl; and a functionalizing agent selected from:

(i)

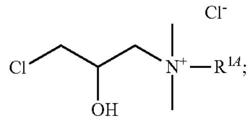

Cl—$CH_2$—CH(OH)—$SO_3$M, Cl—$CH_2$—CH(OH)—$SO_4$M, Cl—$CH_2$—CH(OH)—$CH_2$—OP(O)—$(OM)_2$, and combinations thereof, wherein $R^{1A}$ is $CH_3(CH_2)_n$—;

(ii) —Cl—$CH_2$—C(O)—O—$^-Na^+$, 2-halocarboxylic acid, α,β-unsaturated carboxylic acid, cyclic carboxylic acid anhydride, and combinations thereof;

(iii)

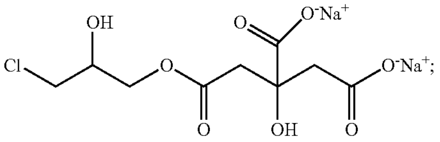

M is a charge balancing group selected from H, Na, K, or $NH_4^+$; and n is an integer from 0-36;

and positional isomers thereof.

15. The composition of claim 1, wherein the functionalized alkyl polyglucoside is a composition that includes the following, as a mixture:

(a)

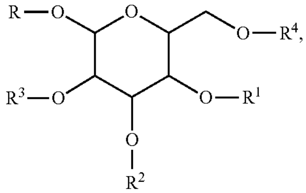

wherein:

R is an alkyl chain having 8 to 22 carbon atoms;

$R^1$, $R^2$, $R^3$, and $R^4$ are independently selected from the group consisting of:

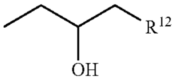

and H, with the proviso that $R^1$, $R^2$, $R^3$, and $R^4$ are not all H;

$R^{12}$ is selected from the group consisting of:

—OH, —$SO_3^-M^+$, —$SO_4^{-2}M^+$, and —O—P(O)—(OM) 2;

M is selected from the group consisting of Na, K, $NH^4$; and (b)

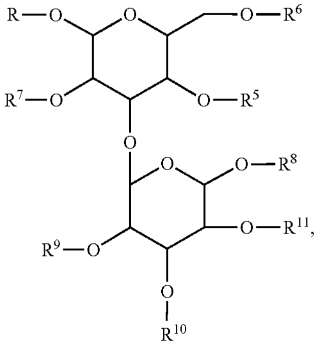

wherein $R^6$, $R^7$, $R^8$, $R^9$, $R^{10}$, and $R^{11}$ are independently selected from the group consisting of:

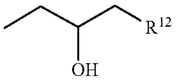

and H; and $R^{12}$ is selected from the group consisting of:

—OH, —O—P(O)—$(OM)_2$, —$SO_3^-M^+$, and —$SO_4^-$ 2$M^+$, and M is selected from the group consisting of Na, K, $NH^4$;

and positional isomers thereof.

16. The composition of claim 1, wherein the functionalized alkyl polyglucoside includes the following, as a mixture:

(a)

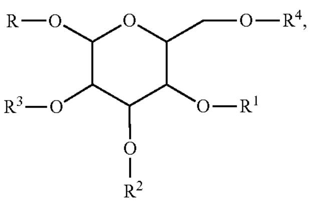

wherein

R is alkyl having 8 to 22 carbon atoms;

$R^1$, $R^2$, $R^3$, and $R^4$ are independently selected from

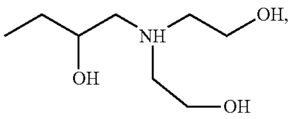

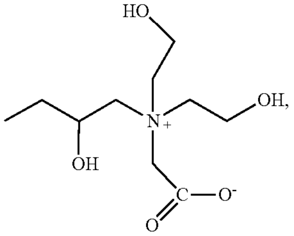

and H, with the proviso that $R^1$, $R^2$, $R^3$, and $R^4$ are not all H;

and (b)

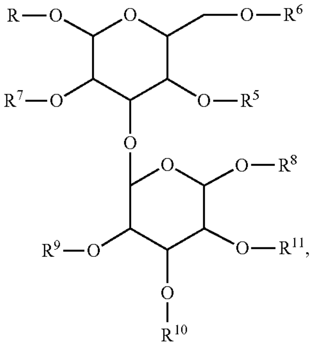

wherein

R is alkyl having 8 to 22 carbon atoms;

$R^5$, $R^6$, $R^7$, $R^8$, $R^9$, $R^{10}$, and $R^{11}$ are independently selected from

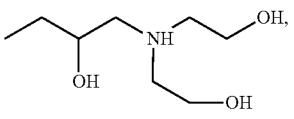

-continued

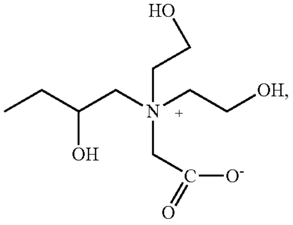

and H, with the proviso that $R^5$, $R^6$, $R^7$, $R^8$, $R^9$, $R^{10}$, and $R^{11}$ are not all H;

and positional isomers thereof.

17. The composition of claim 1, wherein the functionalized alkyl polyglucoside includes the following, as a mixture:

(a)

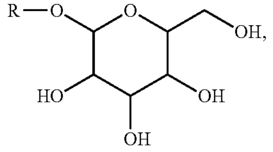

wherein;

R is alkyl having 8 to 22 carbon atoms; and (b)

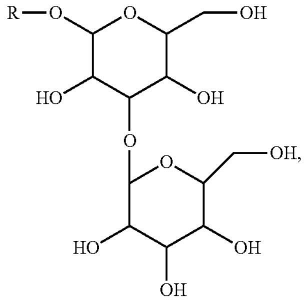

wherein:

R is alkyl having 8 to 22 carbon atoms;

a crosslinker of the following formula: $Cl—CH_2—CH(OH)—CH_2—Cl$; and a functionalizing agent selected from:

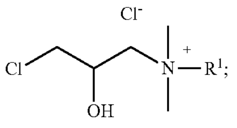

$Cl—CH_2—CH(OH)—SO_3M$;

$Cl—CH_2—CH(OH)—SO_4M$;

$Cl—CH_2—CH(OH)\ CH_2—OP(O)—(OM)_2$;

and mixtures thereof;

wherein $R^1$ is $CH_3—(CH_2)_n$;

n is an integer from 0 to 36;

M is a charge balancing group selected from H, Na, K, or $NH_4$;

and positional isomers thereof.

18. The composition of claim 1, wherein the functionalized alkyl polyglucoside includes the following, as a mixture:

(a)

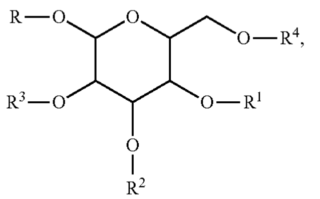

wherein

R is alkyl having 8 to 22 carbon atoms;

$R^1$, $R^2$, $R^3$, and $R^4$ are independently selected from $—CH_2—CH(OH)—CH_2—R^{12}$, and H, with the proviso that $R^1$, $R^2$, $R^3$, and $R^4$ are not all H;

$R^{12}$ is $—O—C(O)—CH_2—CH(SO_3\ M^+)—C(O)—O^-M^+$

M is a charge balancing group selected from H, Na, K, or $NH_4$, and (b)

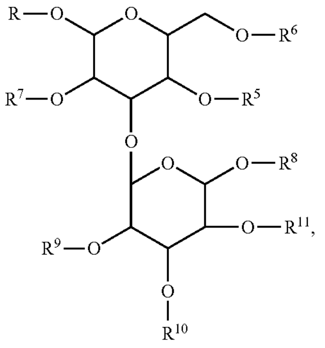

wherein

R is alkyl having 8 to 22 carbon atoms;

$R^5$, $R^6$, $R^7$, $R^8$, $R^9$, $R^{10}$, and $R^{11}$ are independently selected from $—CH_2—CH(OH)—CH_2—R^{12}$, and H, with the proviso that $R^5$, $R^6$, $R^7$, $R^8$, $R^9$, $R^{10}$, and $R^{11}$ are not all H;

$R^{12}$ is $—O—C(O)—CH_2—CH(SO_3\ M^+)—C(O)—O^-M^+$

M is a charge balancing group selected from H, Na, K, or $NH_4$;

and positional isomers thereof.

19. The composition of claim 1, wherein the functionalized alkyl polyglucoside is a composition that includes the following, as a mixture:

(a)

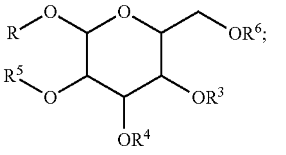

wherein one of $R^3$, $R^4$, $R^5$, and $R^6$ is $—CH_2—C(O)—O^-$ $M^+$ or $—C(O)—CH_2—C(O)—O^-M^+$, with the remaining R groups being H; R is alkyl having 6 to 30 carbon atoms; M is H, Na, or K; and (b) a 1,3 dicloloro-2-propanol crosslinker;

and positional isomers thereof.

20. The composition of claim 1, wherein the functionalized alkyl polyglucoside is a composition that includes the following, as a mixture:

(a)

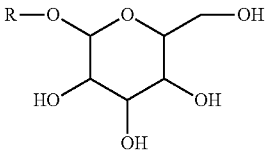

and (b)

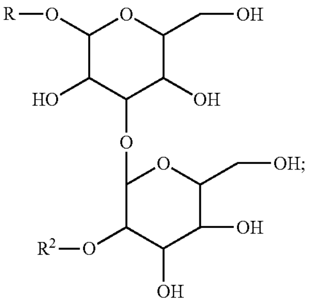

wherein R is an alkyl having 8 to 22 carbons, and $R^2$ is:

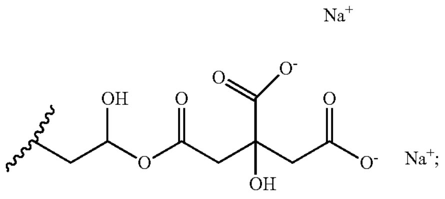 [SMILES: [Na+] ; *CC(O)OC(=O)CC(O)(CC(=O)[O-])C(=O)[O-]]

and positional isomers thereof.

21. The composition of claim 1, wherein the functionalized alkyl polyglucoside includes a compound of the following formula:

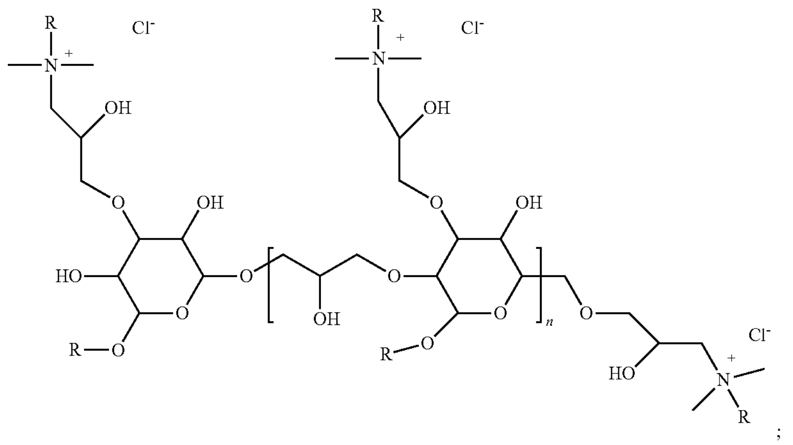

wherein R is an alkyl group having from about 8 to about 22 carbon atoms and n is an integer ranging from 4 to 6; and positional isomers thereof.

22. The composition of claim 1, wherein the functionalized alkyl polyglucoside includes a compound of the following formula:

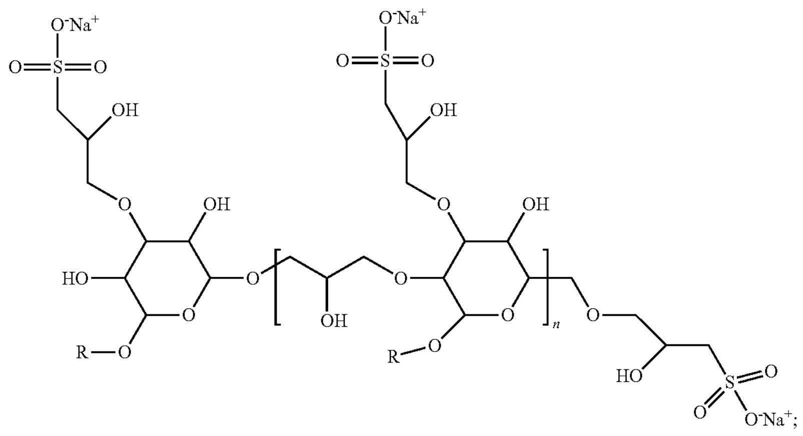

wherein R is an alkyl group having from about 8 to about 22 carbon atoms and n is an integer ranging from 4 to 6; and positional isomers thereof.

23. The composition of claim 1, wherein the functionalized alkyl polyglucoside includes a compound of the following formula:

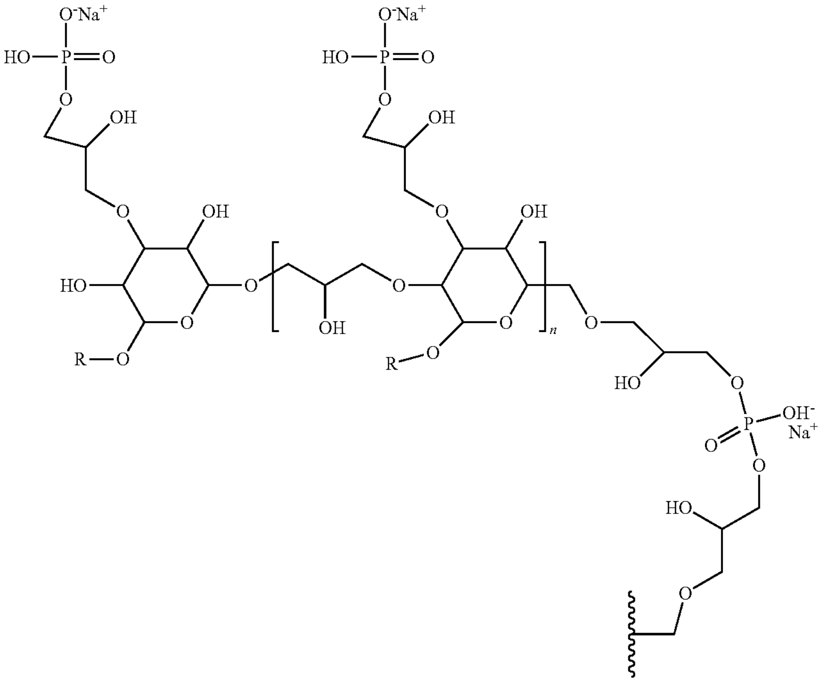

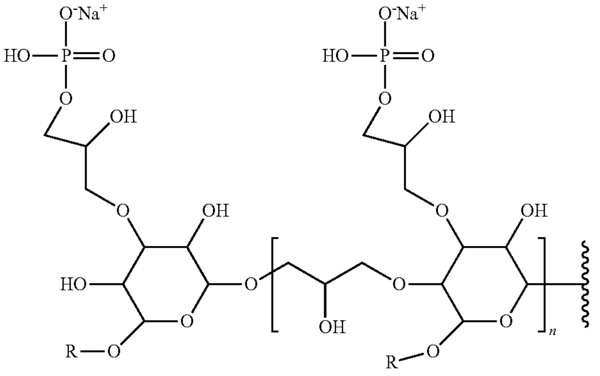
;

wherein R is an alkyl group having from about 8 to about 22 carbon atoms; and positional isomers thereof.

24. The composition of claim 1, wherein the functionalized alkyl polyglucoside includes a compound of the following formula:

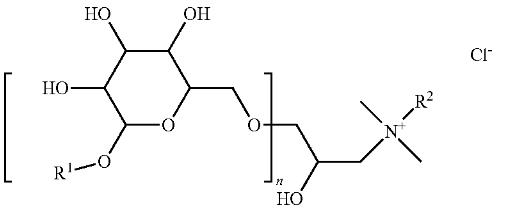
, wherein $R^1$ is an alkyl group having from about 8 to about 22 carbon atoms, and $R^2$ is $CH_3(CH_2)_n$, and n is independently an integer from 0-21; and positional isomers thereof.

25. The composition of claim 1, wherein the functionalized alkyl polyglucoside is a composition that includes the following compound:

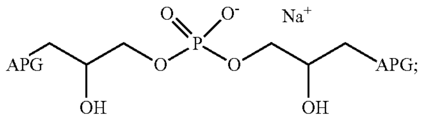

wherein APG is alkyl polyglucoside; and positional isomers thereof.

26. The composition of claim 1, wherein the functionalized alkyl polyglucoside is a composition that includes the following compound:

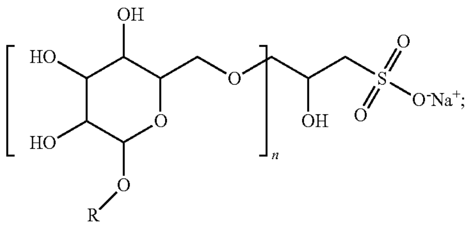

wherein n is between 1 to about 3; R is an alkyl chain; and positional isomers thereof.

27. The composition of claim 1, wherein the nonionic sorbitan alkyl polyglucoside crosspolymer/functionalized alkylpolyglucoside blend is about 50:50.

28. The composition of claim 1, wherein the acid source is present in an amount such that, when the composition is diluted with water to form a use solution, the use solution has a pH of from about 6.5 to about 10.

29. The composition of claim 1, wherein the composition is a hard-surface cleaning composition for removing organic soil from a surface.

30. The composition of claim 1, wherein the composition is a concentrate configured to be diluted with water before application to a surface.

31. The composition of claim 1, wherein the at least one functionalized anionic or cationic alkyl polyglucoside comprises a sulfonate-functionalized alkyl polyglucoside, a phosphate-functionalized alkyl polyglucoside, or a polyquaternary-functionalized alkyl polyglucoside.

32. A method of cleaning a surface, comprising applying an effective cleaning amount of the composition of claim 1 to a surface having a food soil or grease product thereon.

* * * * *